US011689912B2

(12) United States Patent
Nair et al.

(10) Patent No.: US 11,689,912 B2
(45) Date of Patent: Jun. 27, 2023

(54) METHODS, SYSTEMS, AND COMPUTER READABLE MEDIA FOR CONDUCTING A VELOCITY CHECK FOR OUTBOUND SUBSCRIBERS ROAMING TO NEIGHBORING COUNTRIES

(71) Applicant: Oracle International Corporation, Redwood Shores, CA (US)

(72) Inventors: Nikita Satish Nair, Mumbai (IN); Rajeev Chaurasia, New Delhi (IN); Vipin Kumar, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/319,023

(22) Filed: May 12, 2021

(65) Prior Publication Data

US 2022/0369091 A1    Nov. 17, 2022

(51) Int. Cl.
*H04W 12/12* (2021.01)
*H04W 8/04* (2009.01)
(Continued)

(52) U.S. Cl.
CPC .............. *H04W 8/04* (2013.01); *H04W 8/12* (2013.01); *H04W 8/28* (2013.01); *H04W 12/06* (2013.01)

(58) Field of Classification Search
CPC ........... H04W 8/04; H04W 8/12; H04W 8/28; H04W 12/06; H04W 12/12; H04W 12/63
See application file for complete search history.

(56) References Cited

U.S. PATENT DOCUMENTS 6,091,958 A    7/2000  Bergkvist et al.
6,151,503 A    11/2000  Chavez
(Continued)

FOREIGN PATENT DOCUMENTS

CN    101277541 A    10/2008
CN    10135561 A    1/2009
(Continued)

OTHER PUBLICATIONS

Non-Final Office Action for U.S. Appl. No. 17/175,260 (dated Aug. 29, 2022).
(Continued)

*Primary Examiner* — Khawar Iqbal
(74) *Attorney, Agent, or Firm* — Jenkins, Wilson, Taylor & Hunt, P.A.

(57) ABSTRACT

A method for conducting a velocity check for outbound subscribers roaming to neighboring countries includes receiving, by a network gateway associated with a home country from an MSC associated with a neighboring country, an ingress signaling message related to a mobile device roaming in the neighboring country, sending, to an HLR in the home country, an interrogation request message containing a mobile subscriber identifier, and receiving an interrogation response message containing age of location information and cell identifier information corresponding to the mobile subscriber identifier. The method further includes utilizing the cell identifier information and a country code identifier included in the ingress signaling message to determine two latitude-longitude positions, determining an estimated transit time of the mobile device using the two latitude-longitude reference positions, and comparing age of location information with the estimated transit time to determine if the ingress signaling message is to be forwarded to the HLR.

20 Claims, 6 Drawing Sheets

(51) Int. Cl.
  *H04W 8/12* (2009.01)
  *H04W 8/28* (2009.01)
  *H04W 12/06* (2021.01)

(56) References Cited

U.S. PATENT DOCUMENTS

| | | |
|---|---|---|
| 6,292,666 B1 | 9/2001 | Siddiqui et al. |
| 6,308,075 B1 | 10/2001 | Irten et al. |
| 6,343,215 B1 | 1/2002 | Calabrese et al. |
| 6,591,101 B1 | 7/2003 | Shimbori |
| 7,043,754 B2 | 5/2006 | Arnouse |
| 7,567,661 B1 | 7/2009 | Wood et al. |
| 8,045,956 B2 | 10/2011 | Sun et al. |
| 8,145,234 B1 | 3/2012 | Leonard et al. |
| 8,509,074 B1 | 8/2013 | Roberts et al. |
| 8,615,217 B2 | 12/2013 | Ravishankar et al. |
| 8,879,431 B2 | 11/2014 | Ridel et al. |
| 9,015,808 B1 | 4/2015 | Koller et al. |
| 9,060,263 B1 | 6/2015 | Carames et al. |
| 9,106,428 B2 | 8/2015 | Matthews et al. |
| 9,106,769 B2 | 8/2015 | Kanode et al. |
| 9,191,803 B2 | 11/2015 | Patel et al. |
| 9,240,946 B2 | 1/2016 | Cai et al. |
| 9,374,840 B2 | 6/2016 | Monedero Recuero |
| 9,538,335 B1 | 1/2017 | Bank et al. |
| 9,628,994 B1 | 4/2017 | Gunyel et al. |
| 9,681,360 B1 | 6/2017 | Salyers et al. |
| 9,912,486 B1 | 3/2018 | Sharifi Mehr |
| 10,009,751 B2 | 6/2018 | Gundavelli et al. |
| 10,021,738 B1 | 7/2018 | Mehta et al. |
| 10,045,326 B2 * | 8/2018 | Blanchard ............ H04W 64/006 |
| 10,168,413 B2 | 1/2019 | Annamalai et al. |
| 10,212,538 B2 | 2/2019 | Russell |
| 10,230,726 B2 * | 3/2019 | Barkan ............. H04M 3/42042 |
| 10,237,721 B2 | 3/2019 | Gupta et al. |
| 10,306,459 B1 * | 5/2019 | Patil ........................ H04W 8/06 |
| 10,470,154 B2 | 11/2019 | Chellamani et al. |
| 10,511,998 B1 | 12/2019 | Vallur |
| 10,616,200 B2 | 4/2020 | Kumar et al. |
| 10,652,850 B2 | 5/2020 | Landais et al. |
| 10,776,791 B2 * | 9/2020 | Ferguson .......... H04W 12/0431 |
| 10,834,045 B2 | 11/2020 | Mahalank et al. |
| 10,834,571 B1 | 11/2020 | Yau et al. |
| 10,931,668 B2 | 2/2021 | Mehta |
| 10,952,063 B2 * | 3/2021 | Mehta ................. H04L 63/0227 |
| 10,984,128 B1 | 4/2021 | Hoffer |
| 11,050,788 B2 | 6/2021 | Livanos |
| 11,068,534 B1 * | 7/2021 | Svendsen ............... H04W 4/021 |
| 11,140,555 B2 * | 10/2021 | Thai ...................... H04L 63/107 |
| 11,265,695 B2 * | 3/2022 | Shah ....................... H04W 8/04 |
| 11,272,560 B1 | 3/2022 | Vivanco et al. |
| 11,368,839 B2 | 6/2022 | Targali |
| 11,411,925 B2 * | 8/2022 | Kumar ................ H04W 12/086 |
| 11,516,671 B2 | 11/2022 | Rajput et al. |
| 11,553,342 B2 | 1/2023 | Mahalank et al. |
| 2001/0046856 A1 | 11/2001 | McCann |
| 2002/0080752 A1 | 6/2002 | Johansson et al. |
| 2002/0098856 A1 | 7/2002 | Berg et al. |
| 2002/0181448 A1 | 12/2002 | Uskela et al. |
| 2002/0193127 A1 | 12/2002 | Martschitsch |
| 2003/0087647 A1 | 5/2003 | Hurst |
| 2004/0140908 A1 | 7/2004 | Gladwin et al. |
| 2005/0182968 A1 | 8/2005 | Izatt et al. |
| 2005/0232236 A1 | 10/2005 | Allison et al. |
| 2006/0068762 A1 | 3/2006 | Baldwin et al. |
| 2006/0193258 A1 | 8/2006 | Ballai |
| 2006/0211406 A1 | 9/2006 | Szucs et al. |
| 2006/0242414 A1 | 10/2006 | Corson et al. |
| 2007/0011261 A1 | 1/2007 | Madams et al. |
| 2007/0165527 A1 | 7/2007 | Sultan et al. |
| 2007/0165626 A1 | 7/2007 | Sultan et al. |
| 2007/0174082 A1 | 7/2007 | Singh |
| 2007/0223372 A1 | 9/2007 | Haalen et al. |
| 2007/0248032 A1 | 10/2007 | Vasudevan et al. |
| 2007/0281718 A1 | 12/2007 | Nooren |
| 2008/0004047 A1 | 1/2008 | Hill et al. |
| 2008/0020704 A1 | 1/2008 | Costa |
| 2008/0026778 A1 | 1/2008 | Cai et al. |
| 2008/0045246 A1 | 2/2008 | Murtagh et al. |
| 2008/0051061 A1 | 2/2008 | Takahashi |
| 2008/0076430 A1 | 3/2008 | Olson |
| 2008/0125116 A1 | 5/2008 | Jiang |
| 2008/0168540 A1 | 7/2008 | Agarwal et al. |
| 2008/0207181 A1 | 8/2008 | Jiang |
| 2008/0222038 A1 | 9/2008 | Eden |
| 2008/0259798 A1 | 10/2008 | Loh et al. |
| 2009/0045251 A1 | 2/2009 | Jaiswal et al. |
| 2009/0168719 A1 | 7/2009 | Mercurio |
| 2009/0191915 A1 | 7/2009 | Abramson et al. |
| 2009/0195349 A1 | 8/2009 | Frader-Thompson et al. |
| 2010/0062789 A1 | 3/2010 | Agarwal et al. |
| 2010/0098414 A1 | 4/2010 | Kramer et al. |
| 2010/0100958 A1 | 4/2010 | Jeremiah |
| 2010/0105355 A1 | 4/2010 | Nooren |
| 2010/0130227 A1 | 5/2010 | Farthofer et al. |
| 2010/0161817 A1 | 6/2010 | Xiao et al. |
| 2010/0223222 A1 | 9/2010 | Zhou et al. |
| 2010/0235911 A1 | 9/2010 | Nooren |
| 2010/0240361 A1 | 9/2010 | Jiang |
| 2010/0313024 A1 | 12/2010 | Weniger et al. |
| 2011/0009085 A1 | 1/2011 | Albanes et al. |
| 2011/0014939 A1 | 1/2011 | Ravishankar et al. |
| 2011/0029655 A1 | 2/2011 | Forbes, Jr. et al. |
| 2011/0063126 A1 | 3/2011 | Kennedy et al. |
| 2011/0124317 A1 | 5/2011 | Joo |
| 2011/0124334 A1 | 5/2011 | Brisebois et al. |
| 2011/0158090 A1 | 6/2011 | Riley et al. |
| 2011/0173122 A1 | 7/2011 | Singhal |
| 2011/0191835 A1 | 8/2011 | Hawkes et al. |
| 2011/0217979 A1 | 9/2011 | Nas |
| 2011/0225091 A1 | 9/2011 | Plastina et al. |
| 2011/0246178 A1 | 10/2011 | Arzelier |
| 2011/0307381 A1 | 12/2011 | Kim et al. |
| 2012/0099715 A1 | 4/2012 | Ravishankar et al. |
| 2012/0110637 A1 | 5/2012 | Holtmanns et al. |
| 2012/0115512 A1 | 5/2012 | Grainger et al. |
| 2012/0131121 A1 | 5/2012 | Snyder et al. |
| 2012/0202481 A1 | 8/2012 | Martin |
| 2012/0203663 A1 | 8/2012 | Sinclair et al. |
| 2012/0207015 A1 | 8/2012 | Marsico |
| 2013/0035118 A1 | 2/2013 | Hamano et al. |
| 2013/0010231 A1 | 4/2013 | Malonda |
| 2013/0102231 A1 | 4/2013 | Joseph et al. |
| 2013/0171988 A1 | 7/2013 | Yeung et al. |
| 2013/0276035 A1 | 10/2013 | Walker et al. |
| 2013/0331063 A1 | 12/2013 | Cormier et al. |
| 2014/0195630 A1 | 7/2014 | Malik et al. |
| 2014/0199961 A1 | 7/2014 | Mohammed et al. |
| 2014/0199996 A1 | 7/2014 | Wang et al. |
| 2014/0259012 A1 | 9/2014 | Nandlall et al. |
| 2014/0280645 A1 | 9/2014 | Shuman et al. |
| 2014/0370922 A1 | 12/2014 | Richards |
| 2014/0378129 A1 | 12/2014 | Jiang et al. |
| 2015/0012415 A1 | 1/2015 | Livne et al. |
| 2015/0038156 A1 | 2/2015 | Kilpatrick, II et al. |
| 2015/0081579 A1 | 3/2015 | Brown et al. |
| 2015/0094060 A1 | 4/2015 | Kouridakis et al. |
| 2015/0119092 A1 | 4/2015 | Yi et al. |
| 2015/0121078 A1 | 4/2015 | Fu et al. |
| 2015/0188979 A1 | 7/2015 | Almeras et al. |
| 2015/0244486 A1 | 8/2015 | Liang et al. |
| 2015/0304220 A1 | 10/2015 | Miyao |
| 2015/0304803 A1 | 10/2015 | Chen et al. |
| 2015/0341341 A1 | 11/2015 | Messerges |
| 2015/0350196 A1 | 12/2015 | Toyonaga et al. |
| 2016/0088461 A1 | 3/2016 | Jiang |
| 2016/0119773 A1 | 4/2016 | Xu et al. |
| 2016/0156647 A1 | 6/2016 | Engel et al. |
| 2016/0165432 A1 | 6/2016 | Dubesset et al. |
| 2016/0183117 A1 | 6/2016 | Hsu et al. |
| 2016/0183178 A1 | 6/2016 | Marimuthu |
| 2016/0219043 A1 | 7/2016 | Blanke |
| 2016/0234119 A1 | 8/2016 | Zaidi et al. |
| 2016/0269566 A1 | 9/2016 | Gundamaraju et al. |

(56) References Cited

U.S. PATENT DOCUMENTS

| | | |
|---|---|---|
| 2016/0292687 A1 | 10/2016 | Kruglick |
| 2016/0337976 A1 | 11/2016 | Wang et al. |
| 2016/0365983 A1 | 12/2016 | Shahabuddin et al. |
| 2016/0381699 A1 | 12/2016 | Rubin et al. |
| 2017/0006431 A1 | 1/2017 | Donovan et al. |
| 2017/0201778 A1 | 7/2017 | Bailey et al. |
| 2017/0244676 A1 | 8/2017 | Edwards |
| 2017/0245207 A1 | 8/2017 | Stammers et al. |
| 2017/0257866 A1 | 9/2017 | Chaudhuri et al. |
| 2017/0272921 A1 | 9/2017 | Kim et al. |
| 2017/0289048 A1 | 10/2017 | Chao et al. |
| 2017/0295201 A1 | 10/2017 | Peylo et al. |
| 2017/0345006 A1 | 11/2017 | Kohli |
| 2017/0366499 A1 | 12/2017 | De Boer et al. |
| 2018/0020324 A1 | 1/2018 | Beauford |
| 2018/0109632 A1 | 4/2018 | Stammers et al. |
| 2018/0109953 A1 | 4/2018 | He |
| 2018/0115970 A1 | 4/2018 | Chae et al. |
| 2018/0167906 A1 | 6/2018 | Chellamani et al. |
| 2018/0205698 A1 | 7/2018 | Gupta et al. |
| 2018/0220301 A1 | 8/2018 | Gallagher et al. |
| 2018/0270765 A1 | 9/2018 | Wang |
| 2018/0288127 A1 | 10/2018 | Zaidi et al. |
| 2018/0288198 A1 | 10/2018 | Pope et al. |
| 2018/0310162 A1 | 10/2018 | Kim et al. |
| 2019/0007788 A1 | 1/2019 | Russell |
| 2019/0037484 A1 | 1/2019 | Davies et al. |
| 2019/0044932 A1 | 2/2019 | Kumar et al. |
| 2019/0074982 A1 | 3/2019 | Hughes |
| 2019/0090086 A1 | 3/2019 | Graham et al. |
| 2019/0116624 A1 | 4/2019 | Tandon et al. |
| 2019/0182875 A1 | 6/2019 | Talebi Fard et al. |
| 2019/0253885 A1 | 8/2019 | Bykampadi et al. |
| 2019/0306166 A1 | 10/2019 | Konda et al. |
| 2019/0342217 A1 | 11/2019 | Mazurek |
| 2019/0354709 A1 | 11/2019 | Brinskelle |
| 2019/0364460 A1 | 11/2019 | Bogineni et al. |
| 2020/0007538 A1 | 1/2020 | Mehta |
| 2020/0036754 A1 | 1/2020 | Livanos |
| 2020/0042799 A1* | 2/2020 | Huang .................. G08G 1/0116 |
| 2020/0053044 A1* | 2/2020 | Mahalank .............. H04W 12/12 |
| 2020/0077260 A1 | 3/2020 | Hancock et al. |
| 2020/0107291 A1 | 4/2020 | Nayak et al. |
| 2020/0145432 A1 | 5/2020 | Verma et al. |
| 2020/0169510 A1 | 5/2020 | Kadosh et al. |
| 2020/0187089 A1 | 6/2020 | Meredith et al. |
| 2020/0221541 A1 | 7/2020 | Yan |
| 2020/0259896 A1 | 8/2020 | Sachs et al. |
| 2020/0329363 A1 | 10/2020 | Mehta |
| 2020/0344604 A1 | 10/2020 | He et al. |
| 2020/0359218 A1 | 11/2020 | Lee et al. |
| 2020/0404490 A1 | 12/2020 | Thai et al. |
| 2021/0022070 A1 | 1/2021 | Letor et al. |
| 2021/0111985 A1 | 4/2021 | Mahalank et al. |
| 2021/0112012 A1 | 4/2021 | Krishan et al. |
| 2021/0142143 A1 | 5/2021 | Howard |
| 2021/0152494 A1 | 5/2021 | Johnsen et al. |
| 2021/0168751 A1 | 6/2021 | Stojanovski et al. |
| 2021/0176177 A1 | 6/2021 | Kubo et al. |
| 2021/0194903 A1 | 6/2021 | Medvedovsky et al. |
| 2021/0203636 A1 | 7/2021 | Kumar et al. |
| 2021/0203643 A1 | 7/2021 | Jost et al. |
| 2021/0211946 A1 | 7/2021 | Li |
| 2021/0234706 A1 | 7/2021 | Nair et al. |
| 2021/0243165 A1 | 8/2021 | Bykampadi et al. |
| 2021/0250186 A1 | 8/2021 | Bykampadi et al. |
| 2021/0258824 A1 | 8/2021 | John et al. |
| 2021/0274436 A1 | 9/2021 | Sun et al. |
| 2021/0297942 A1 | 9/2021 | Bykampadi et al. |
| 2021/0321303 A1 | 10/2021 | Nair et al. |
| 2021/0377138 A1 | 12/2021 | Sun et al. |
| 2021/0377212 A1 | 12/2021 | Holtmanns et al. |
| 2021/0399988 A1 | 12/2021 | Labonte |
| 2021/0400538 A1 | 12/2021 | Ke |
| 2021/0406038 A1 | 12/2021 | Fetzer et al. |
| 2022/0021586 A1 | 1/2022 | Kazmierski |
| 2022/0022027 A1 | 1/2022 | Xin et al. |
| 2022/0022040 A1 | 1/2022 | Mahalank et al. |
| 2022/0030413 A1 | 1/2022 | Ben Henda et al. |
| 2022/0038394 A1 | 2/2022 | Anubolu et al. |
| 2022/0052847 A1 | 2/2022 | Gonzalez Cervantes et al. |
| 2022/0070674 A1 | 3/2022 | Russell |
| 2022/0104020 A1 | 3/2022 | Rajput |
| 2022/0104112 A1 | 3/2022 | Rajput |
| 2022/0124079 A1 | 4/2022 | Patil et al. |
| 2022/0124479 A1 | 4/2022 | Iddya |
| 2022/0124501 A1 | 4/2022 | Bykampadi et al. |
| 2022/0150212 A1 | 5/2022 | Rajput |
| 2022/0158847 A1 | 5/2022 | Aggarwal et al. |
| 2022/0159445 A1* | 5/2022 | Rajavelu ................. H04W 8/18 |
| 2022/0174544 A1 | 6/2022 | Taft et al. |
| 2022/0182923 A1 | 6/2022 | Yao et al. |
| 2022/0191694 A1 | 6/2022 | Rajput |
| 2022/0191763 A1 | 6/2022 | Roeland et al. |
| 2022/0200951 A1 | 6/2022 | Goel |
| 2022/0200966 A1 | 6/2022 | De-Gregorio-Rodriguez et al. |
| 2022/0201489 A1 | 6/2022 | Mahalank |
| 2022/0264260 A1 | 8/2022 | Chaurasia et al. |
| 2022/0272069 A1* | 8/2022 | Verma ................... H04L 63/168 |
| 2022/0272541 A1 | 8/2022 | Rajput et al. |

FOREIGN PATENT DOCUMENTS

| | | |
|---|---|---|
| CN | 101742445 A | 6/2010 |
| CN | 101917698 A | 12/2010 |
| CN | 102656845 A | 9/2012 |
| CN | 103179504 A | 6/2013 |
| CN | 103444212 A | 12/2013 |
| CN | 107800664 A | 3/2018 |
| CN | 110035433 A | 7/2019 |
| CN | 110800322 B | 5/2021 |
| CN | ZL202080007649.X | 9/2022 |
| EP | 1 067 492 A2 | 1/2001 |
| EP | 1 906 682 A1 | 4/2008 |
| EP | 2 204 955 A1 | 7/2010 |
| EP | 2 785 125 B1 | 8/2018 |
| EP | 3 493 569 A1 | 6/2019 |
| EP | 3 646 630 B1 | 8/2021 |
| EP | 3 662 630 | 8/2021 |
| EP | 3954146 A1 | 2/2022 |
| EP | 3 821 630 B1 | 7/2022 |
| ES | 2 548 005 T3 | 10/2015 |
| GB | 2503973 A | 1/2014 |
| IN | 401247 | 7/2018 |
| JP | 2008-053808 A | 3/2008 |
| JP | 7038148 B2 | 3/2022 |
| JP | 7113147 B | 8/2022 |
| JP | 7133010 | 8/2022 |
| JP | 7133010 B2 | 9/2022 |
| WO | WO 01/88790 A1 | 11/2001 |
| WO | WO 2005/091656 A1 | 9/2005 |
| WO | WO 2005/101872 A1 | 10/2005 |
| WO | WO 2007/084503 A2 | 7/2007 |
| WO | WO 2008/053808 A1 | 5/2008 |
| WO | WO-2010/021886 A1 | 2/2010 |
| WO | WO 2010/045646 A2 | 4/2010 |
| WO | WO 2010/105099 A2 | 9/2010 |
| WO | WO 2011/010640 A1 | 1/2011 |
| WO | WO 2011/047382 A2 | 4/2011 |
| WO | WO 2016/201990 A1 | 12/2016 |
| WO | WO 2017/082532 A1 | 5/2017 |
| WO | WO 2018/202284 A1 | 11/2018 |
| WO | WO 2019/005287 A1 | 1/2019 |
| WO | WO 2019/027813 A1 | 2/2019 |
| WO | WO 2019/224157 A1 | 11/2019 |
| WO | WO 2020/013889 A1 | 1/2020 |
| WO | WO 2020/033113 A1 | 2/2020 |
| WO | WO 2020/036883 A1 | 2/2020 |
| WO | WO 2020/164763 A1 | 8/2020 |
| WO | WO 2020/174121 A1 | 9/2020 |
| WO | WO 2020/179665 A1 | 9/2020 |
| WO | WO 2020/210015 A1 | 10/2020 |
| WO | WO 2020/257018 A1 | 12/2020 |
| WO | WO 2021/138072 A1 | 7/2021 |

(56) References Cited

FOREIGN PATENT DOCUMENTS

| | | |
|---|---|---|
| WO | WO 2022/015378 A1 | 1/2022 |
| WO | WO 2022/046176 A1 | 3/2022 |
| WO | WO 2022/066227 | 3/2022 |
| WO | WO 2022/066228 A1 | 3/2022 |
| WO | WO 2022/086596 A1 | 4/2022 |
| WO | WO 2022/098404 A1 | 5/2022 |
| WO | WO 2022/103454 A1 | 5/2022 |
| WO | WO 2022/132315 A1 | 6/2022 |
| WO | WO 2022/132316 A1 | 6/2022 |
| WO | WO 2022/182448 A1 | 9/2022 |

OTHER PUBLICATIONS

Notice of Allowance and Fee(s) Due and Examiner-Initiated Interview Summary for U.S. Appl. No. 16/929,048 (dated Aug. 24, 2022).
Notification of Transmittal of the International Search Report and the Written Opinion of the International Searching Authority or the Declaration for International Application No. PCT/US2022/026415 (dated Aug. 12, 2022).
Notice to Grant for Japanese Patent Application Serial No. 2021-545918 (dated Jun. 28, 2022).
"5G; Policy and Charging Control signaling flows and parameter mapping (3GPP TS 29.513 version 15.6.0 Release 15)," ETSI TS 129 513, V15.6.0, pp. 1-92 (Jan. 2020).
Final Office Action for U.S. Appl. No. 17/076,482 (dated Aug. 5, 2022).
Notice of Allowance and Fee(s) Due and Examiner-Initiated Interview Summary for U.S. Appl. No. 17/129,487 (dated Jul. 25, 2022).
Notice of Allowance and Fee(s) Due and Examiner-Initiated Interview Summary for U.S. Appl. No. 17/185,934 (dated Jul. 21, 2022).
Non-Final Office Action for U.S. Appl. No. 17/099,683 (dated Jul. 15, 2022).
Decision to grant a European patent pursuant to Article 97(1) EPC for European Patent Application Serial No. 19710842.6 (dated Jun. 30, 2022).
Notice of Allowance for Chinese Application Serial No. 202080007649.X (dated Jun. 20, 2022).
Communication under Rule 71(3) EPC Intention to Grant for European Patent Application Serial No. 19 749 059.2 (dated May 16, 2022).
Notification of Transmittal of the International Search Report and the Written Opinion of the International Searching Authority or the Declaration for International Application No. PCT/US2021/042853 (dated Oct. 18, 2021).
Advisory Action and Applicant-Initiated Interview Summary for U.S. Appl. No. 17/099,683 (dated May 23, 2022).
Notification of Transmittal of the International Search Report and the Written Opinion of the International Searching Authority, or the Declaration for International Application No. PCT/US2022/013373 (dated Apr. 11, 2022).
Non-Final Office Action and Examiner Interview Summary for U.S. Appl. No. 16/929,048 (dated Apr. 14, 2022).
Notice of Allowance for U.S. Appl. No. 16/732,098 (dated Apr. 6, 2022).
Examination Report for Indian Application Serial No. 202147030053 (dated Mar. 22, 2022).
Notification of Transmittal of the International Search Report and the Written Opinion of the International Searching Authority or the Declaration for International Application No. PCT/US2021/057156 (dated Mar. 3, 2022).
Non-Final Office Action for Chinese Application Serial No. 202080007649.X (dated Mar. 2, 2022).
Non-Final Office Action for U.S. Appl. No. 17/076,482 (dated Apr. 1, 2022).
Nokia et al., "Support of the mapping from IP addressing information provided to an AF to the user identity," 3GPP SA WG2 Meeting #142e pp. 1-3 (Nov. 16-20, 2020).
China Telecom, "KI #13, New Sol: Trigger Procedures for Requesting Analytics," 3GPP SA WG2 Meeting #S2-139E pp. 1-4 (Aug. 19-Sep. 2, 2020).
First Office Action for Japanese Application Serial No. 2021545918 (dated Mar. 8, 2022).
Non-Final Office Action for U.S. Appl. No. 17/129,487 (dated Mar. 21, 2022).
Intention to grant a European patent pursuant to Article 97(1) EPC for European Patent Application Serial No. 19710842.6 (dated Feb. 24, 2022).
Notice of Allowance for Chinese Application Serial No. 201880040478.3 (dated Feb. 28, 2022).
Notice of Allowance for Japanese Application Serial No. 2019572174 (dated Feb. 8, 2022).
Final Office Action for U.S. Appl. No. 17/099,683 (dated Feb. 15, 2022).
Notification of Transmittal of the International Search Report and the Written Opinion of the International Searching Authority, or the Declaration for International Application No. PCT/US2021/057157 (dated Jan. 27, 2022).
Notification Concerning Availability of the Publication of the International Application for International Application No. PCT/US2021/024002 (dated Jan. 20, 2022).
Examination Report for Indian Application Serial No. 202147005810 (dated Jan. 24, 2022).
Examination Report for Indian Application Serial No. 202147001641 (dated Jan. 13, 2022).
Examination Report for Indian Application Serial No. 202047056970 (dated Jan. 13, 2022).
Nokia et al., "3gpp-Sbi-Consumer-Id," 3GPP TSG-CT WG4 Meeting #101e pp. 1-4 (Nov. 3-13, 2020).
Nokia et al., "SBA Network Function certificate profile," 3GPTT TSG-SA WG3 Meeting #98e pp. 1-5 (Mar. 2-6, 2020).
"3rd Generation Partnership Project; Technical Specification Group Services and System Aspects; Security Aspects; Study on security aspects of the 5G Service Based Architecture (SBA) (Release 16)," 3GPP TR 33.855, V1.3.0 pp. 1-52 (Nov. 2018).
Notification of Transmittal of the International Search Report and the Written Opinion of the International Searching Authority, or the Declaration for International Application No. PCT/US2021/042660 (dated Oct. 26, 2021).
Hearing Notice of Indian Application Serial No. 201947047367 (dated Oct. 11, 2021).
First Office Action for Japanese Application Serial No. 2019572174 (dated Sep. 14, 2021).
Notification of Transmittal of the International Search Report and the Written Opinion of the International Searching Authority, or the Declaration for International Application No. PCT/US2021/033030 (dated Aug. 20, 2021).
First Office Action for Chinese Application Serial No. 201880040478.3 (dated Aug. 26, 2021).
Notification Concerning Availability of the Publication of the International Application for International Application No. PCT/US2020/065763 (dated Jul. 8, 2021).
Non-Final Office Action for U.S. Appl. No. 17/099,683 (dated Sep. 20, 2021).
Decision to grant a European patent pursuant to Article 97(1) EPC for European Patent Application Serial No. 18756018.0 (dated Jul. 29, 2021).
Decision to grant a European patent pursuant to Article 97(1) EPC for European Patent Application Serial No. 18731923.1 (dated Jul. 15, 2021).
Notification of Transmittal of the International Search Report and the Written Opinion of the International Searching Authority, or the Declaration for International Application No. PCT/US2021/029977 (dated Jul. 9, 2021).
Notification of Transmittal of the International Search Report and the Written Opinion of the International Searching Authority, or the Declaration for International Application No. PCT/US2021/029973 (dated Jul. 7, 2021).

(56) References Cited

OTHER PUBLICATIONS

Notification of Transmittal of the International Search Report and the Written Opinion of the International Searching Authority, or the Declaration for International Application No. PCT/US2021/024002 (dated Jun. 29, 2021).
Notification of Transmittal of the International Search Report and the Written Opinion of the International Searching Authority, or the Declaration for International Application No. PCT/US2021/024980 (dated Jun. 23, 2021).
Communication of European publication number and information on the application of Article 67(3) EPC for European Patent Application Serial No. 19710842.6 (dated Apr. 21, 2021).
Communication of European publication number and information on the application of Article 67(3) EPC for European Patent Application Serial No. 19730571.7 (dated Apr. 8, 2021).
International Search Report for International Patent Application Serial No. PCT/US2020/065763 (dated Apr. 6, 2021).
First Examination Report for Indian Patent Application Serial No. 201947047367 (dated Mar. 31, 2021).
Notice of Allowance for Chinese Patent Application Serial No. 201880040477.9 (dated Mar. 29, 2021).
Communication under Rule 71(3) EPC Intention to Grant for European Patent Application Serial No. 18 731 923.1 (dated Mar. 22, 2021).
First Examination Report for Indian Patent Application Serial No. 201947047012 (dated Mar. 18, 2021).
U.S. Appl. No. 17/185,934 for "Methods, Systems, and Computer Readable Media for Mitigating Location Tracking and Denial of Service (DoS) Attacks that Utilize Access And Mobility Management Function (AMF) Location Service," (Unpublished, filed Feb. 25, 2021).
Communication under Rule 71(3) EPC Intention to grant for European Application Serial No. 18 756 018.0 (dated Feb. 24, 2021).
Commonly-Assigned, co-pending U.S. Appl. No. 17/175,260 for "Methods, Systems, and Computer Readable Media for Short Message Delivery Status Report Validation," (Unpublished, filed Feb. 12, 2021).
"3rd Generation Partnership Project; Technical Specification Group Services and System Aspects; Service requirements for the 5G system; Stage 1 (Release 18)," 3GPP TS 22.261, V18.1.1, pp. 1-85 (Jan. 2021).
"3rd Generation Partnership Project; Technical Specification Group Services and System Aspects; Procedures for the 5G System (5GS); Stage 2 (Release 16)," 3GPP TS 23.502, V16.7.1, pp. 1-603 (Jan. 2021).
Fajardo, V. et al., "Diameter Base Protocol, Internet Engineering Task Force (IETF)," RFC 6733, pp. 1-152 (Oct. 2012).
"3rd Generation Partnership Project; Technical Specification Group Core Network and Terminals; Numbering, addressing and identification; (Release 17)," 3GPP TS 23.003, V17.0.0, pp. 1-142 (Dec. 2020).
"3rd Generation Partnership Project; Technical Specification Group Services and System Aspects; Wireless and wireline convergence access support for the 5G System (5GS) (Release 16)," 3GPP TS 23.316, V16.6.0, pp. 1-83 (Dec. 2020).
"3rd Generation Partnership Project; Technical Specification Group Services and System Aspects; Security architecture and procedures for 5G system (Release 17)," 3GPP TS 33.501, V17.0.0, pp. 1-253 (Dec. 2020).
"3rd Generation Partnership Project; Technical Specification Group Core Network and Terminals; 5G System; Common Data Types for Service Based Interfaces; Stage 3 (Release 17)," 3GPP TS 29.571, V17.0.0, pp. 1-128 (Dec. 2020).
"3rd Generation Partnership Project; Technical Specification Group Core Network and Terminals; 5G System; Public Land Mobile Network (PLMN) Interconnection; Stage 3 (Release 16)," 3GPP TS 29.573, V16.5.0, pp. 1-98 (Dec. 2020).

"3rd Generation Partnership Project; Technical Specification Group Core Network and Terminals; 5G System; Location Management Services; Stage 3 (Release 16)," 3GPP TS 29.572, V16.5.0, pp. 1-77 (Dec. 2020).
"3rd Generation Partnership Project; Technical Specification Group Core Network and Terminals; 5G System; Access and Mobility Management Services; Stage 3 (Release 17)," 3GPP TS 29.518, V17.0.0, pp. 1-298 (Dec. 2020).
"3rd Generation Partnership Project; Technical Specification Group Services and System Aspects; System architecture for the 5G System (5GS); Stage 2 (Release 16)," 3GPP TS 23.501, V16.7.0, pp. 1-450 (Dec. 2020).
Commonly-Assigned, co-pending U.S. Appl. No. 17/129,441 for "Methods, Systems, and Computer Readable Media for Mitigating Spoofing Attacks on Security Edge Protection Proxy (SEPP) Inter-Public Land Mobile Network (INTER-PLMN) Forwarding Interface," (Unpublished, filed Dec. 21, 2020).
Commonly-Assigned, co-pending U.S. Appl. No. 17/129,487 for "Methods, Systems, and Computer Readable Media for Ingress Message Rate Limiting," (Unpublished, filed Dec. 21, 2020).
Commonly-Assigned, co-pending U.S. Appl. No. 17/125,943 for "Methods, Systems, and Computer Readable Media for Mitigating 5G Roaming Attacks for Internet of Things (IoT) Devices Based on Expected User Equipment (UE) Behavior Patterns," (Unpublished, filed Dec. 17, 2020).
Commonly-Assigned, co-pending U.S. Appl. No. 17/123,038 for "Methods, Systems, and Computer Readable Media for Message Validation in Fifth Generation (5G) Communications Networks," (Unpublished, filed Dec. 15, 2020).
"3rd Generation Partnership Project; Technical Specification Group Core Network and Terminals; 5G System; Network Function Repository Services; Stage 3 (Release 17)," 3GPP TS 29.510, V17.0.0, pp. 1-229 (Dec. 2020).
Commonly-Assigned, co-pending U.S. Appl. No. 17/099,683 for "Methods, Systems, and Computer Readable Media for Validating Location Update Messages," (Unpublished, filed Nov. 16, 2020).
Commonly-Assigned, co-pending U.S. Appl. No. 17/095,420 for "Methods, Systems, and Computer Readable Media for Mitigating 5G Roaming Spoofing Attacks," (Unpublished, filed Nov. 11, 2020).
SMS Test Numbers: SMS Fake Delivery Receipts, Fake DLR— Tel!—SMS Test Platform and SMS services, Nov. 6, 2020, pp. 1-6, https://telqtele.com/sms-fake-delivery-receipts-fake-dlr/.
Notice of Allowance and Fee(s) Due and Examiner-Initiated Interview Summary for U.S. Appl. No. 16/379,488 (dated Oct. 23, 2020).
Commonly-Assigned, co-pending U.S. Appl. No. 17/076,482 for "Methods, Systems, and Computer Readable Media for Validating a Session Management Function (SMF) Registration Request," (Unpublished, filed Oct. 21, 2020).
Notice of Allowance and Fee(s) Due and Examiner-Initiated Interview Summary for U.S. Appl. No. 16/024,422 (dated Oct. 21, 2020).
"3rd Generation Partnership Project; Technical Specification Group Services and System Aspects; Security architecture and procedures for 5G system (Release 16)," 3GPP TS 33.501, V16.4.0, pp. 1-249 (Sep. 2020).
"3rd Generation Partnership Project; Technical Specification Group Core Network and Terminals; 5G System; Public Land Mobile Network (PLMN) Interconnection; Stage 3 (Release 16)," 3GPP TS 29.573, V16.4.0, pp. 1-95 (Sep. 2020).
"3rd Generation Partnership Project; Technical Specification Group Core Network and Terminals; 5G System; Authentication Server Services; Stage 3 (Release 16)," 3GPP TS 29.509, V16.5.0 pp. 1-60 (Sep. 2020).
"3rd Generation Partnership Project; Technical Specification Group Core Network and Terminals; 5G System; Network Function Repository Services; Stage 3 (Release 16)," 3GPP TS 29.510, V16.5.0, pp. 1-208 (Sep. 2020).
"3rd Generation Partnership Project; Technical Specification Group Core Network and Terminals; Numbering, addressing and identification; (Release 16)," 3GPP TS 23.003, V16.4.0, pp. 1-141 (Sep. 2020).

(56) References Cited

OTHER PUBLICATIONS

"3rd Generation Partnership Project; Technical Specification Group Core Network and Terminals; 5G System; Session Management Services; Stage 3 (Release 16)," 3GPP TS 29.502, V16.5.0, pp. 1-260 (Sep. 2020).

"3rd Generation Partnership Project; Technical Specification Group Services and System Aspects; System architecture for the 5G System (5GS); Stage 2 (Release 16)," 3GPP TS 23.501, V16.6.0, pp. 1-447 (Sep. 2020).

3rd Generation Partnership Project; Technical Specification Group Services and System Aspects; Procedures for the 5G System (5GS); Stage 2 (Release 16), 3GPP TS 23.502, V16.6.0, pp. 1-597 (Sep. 2020).

Notice of Allowance and Fee(s) Due and Examiner-Initiated Interview Summary for U.S. Appl. No. 16/100,172 (dated Sep. 14, 2020).

Commonly-Assigned, co-pending U.S. Appl. No. 17/008,528 for "Methods, Systems, and Computer Readable Media for 5G User Equipment (UE) Historical Mobility Tracking and Security Screening Using Mobility Patterns," (Unpublished, filed Aug. 31, 2020).

First Office Action for Chinese Application Serial No. 201880040477.9 (dated Aug. 5, 2020).

"3rd Generation Partnership Project; Technical Specification Group Services and System Aspects; System architecture for the 5G System (5GS); Stage 2 (Release 16)," 3GPP TS 23.501 V16.5.1, pp. 1-440 (Aug. 2020).

"3rd Generation Partnership Project; Technical Specification Group Core Network and Terminals; 5G System; Network Function Repository Services; Stage 3 (Release 16)," 3GPP TS 29.510, V16.4.0, pp. 1-206 (Jul. 2020).

Notification of Transmittal of the International Search Report and the Written Opinion of the International Searching Authority, or the Declaration for International Application No. PCT/US2020/024234 (dated Jul. 16, 2020).

Non-Final Office Action for U.S. Appl. No. 16/379,488 (dated Jul. 15, 2020).

Commonly-Assigned, co-pending U.S. Appl. No. 16/929,048 for "Methods, Systems, and Computer Readable Media for Mitigating 5G Roaming Security Attacks Using Security Edge Protection Proxy (SEPP)," (Unpublished, filed Jul. 14, 2020).

"3rd Generation Partnership Project; Technical Specification Group Services and System Aspects; Architecture enhancements for 5G System (5GS) to support network data analytics services (Release 16)," 3GPP TS 23.288 V16.4.0, pp. 1-66 (Jul. 2020).

"3rd Generation Partnership Project; Technical Specification Group Core Network and Terminals; 5G System; Public Land Mobile Network (PLMN) Interconnection; Stage 3 (Release 16)," 3GPP TS 29.573, V16.3.0, pp. 1-86 (Jul. 2020).

"3rd Generation Partnership Project; Technical Specification Group Services and System Aspects; Security architecture and procedures for 5G system (Release 16)," 3GPP TS 33.501, V16.3.0, pp. 1-248 (Jul. 2020).

Non-Final Office Action for U.S. Appl. No. 16/024,422 (dated Jul. 8, 2020).

"3rd Generation Partnership Project; Technical Specification Group Services and System Aspects; Security Aspects; Study on security aspects of the 5G Service based Architecture (SBA) (Release 16)," 3GPP TR 33.855, V16.0.0, pp. 1-104 (Jul. 2020).

"3rd Generation Partnership Project; Technical Specification Group Core Network and Terminals; 5G System; Network Function Repository Services; Stage 3 (Release 16)," 3GPP TS 29.510, V16.4.0, pp. 1-192 (Jul. 2020).

Applicant-Initiated Interview Summary for U.S. Appl. No. 16/100,172 (dated Jun. 9, 2020).

"3rd Generation Partnership Project; Technical Specification Group Core Network and Terminals; 5G System; Technical Realization of Service Based Architecture; Stage 3 (Release 16)," 3GPP TS 29.500 V16.4.0, pp. 1-79 (Jun. 2020).

"3rd Generation Partnership Project; Technical Specification Group Core Network and Terminals; 5G System; Network Data Analytics Services; Stage 3 (Release 16)," 3GPP TS 29.520 V16.4.0, pp. 1-91 (Jun. 2020).

Communication of European publication number and information on the application of Article 67(3) EPC for European Application Serial No. 18756018.0 (dated May 13, 2020).

Communication of European publication number and information on the application of Article 67(3) EPC for European Application Serial No. 18731923.1 (dated Apr. 8, 2020).

"3rd Generation Partnership Project; Technical Specification Group Services and System Aspects; Security architecture and procedures for 5G system (Release 16)," 3GPP TS 33.501, V16.2.0, pp. 1-227 (Mar. 2020).

"3rd Generation Partnership Project; Technical Specification Group Services and System Aspects; Procedures for the 5G System (5GS); Stage 2 (Release 16)," 3GPP TS 23.502, V16.4.0, pp. 1-582 (Mar. 2020).

Non-Final Office Action for U.S. Appl. No. 16/100,172 (dated Mar. 6, 2020).

"3rd Generation Partnership Project; Technical Specification Group Services and System Aspects; Security Assurance Specification (SCAS) threats and critical assets in 3GPP network product classes (Release 16)," 3GPP TR 33.926, V16.3.0, pp. 1-60 (Mar. 2020).

Notice of Allowance and Fee(s) Due and Examiner-Initiated Interview Summary for U.S. Appl. No. 15/666,300 (dated Feb. 13, 2020).

Commonly-Assigned, co-pending U.S. Appl. No. 16/732,098 for "Methods, Systems, and Computer Readable Media for Implementing Indirect General Packet Radio Service (GPRS) Tunneling Protocol (GTP) Firewall Filtering Using Diameter Agent and Signal Transfer Point (STP)," (Unpublished, filed Dec. 31, 2019).

Advisory Action and Applicant-Initiated Interview Summary for U.S. Appl. No. 16/100,172 (dated Dec. 20, 2019).

"3rd Generation Partnership Project; Technical Specification Group Services and System Aspects; 5G Security Assurance Specification (SCAS) for the Security Edge Protection Proxy (SEPP) network product class (Release 16)," 3GPP TS 33.517, V.16.1.0, pp. 1-17 (Dec. 2019).

3rd Generation Partnership Project; Technical Specification Group Core Network and Terminals; T8 reference point for Northbound APIs, (Release 15), 3GPP TS 29.122, V15.6.0, pp. 1-300 (Dec. 2019).

"FS.19 Diameter Interconnect Security," GSMA, pp. 1-3 (Dec. 20, 2019).

Notification of Transmittal of the International Search Report and the Written Opinion of the International Searching Authority, or the Declaration for International Application Serial No. PCT/US2019/042203 (dated Nov. 11, 2019).

Applicant-Initiated Interview Summary for U.S. Appl. No. 15/666,300 (dated Oct. 29, 2019).

Final Office Action for U.S. Appl. No. 16/100,172 (dated Oct. 3, 2019).

"Technical Specification Group Core Network and Terminals; Evolved Packet System (EPS); Mobility Management Entity (MME) and Serving GPRS Support Node (SGSN) related interfaces based on Diameter protocol (Release 16)," 3GPP TS 29.272, V16.0.0, pp. 1-180 (Sep. 2019).

"Technical Specification Group Core Network and Terminals; Policy and Charging Control (PCC); Reference points (Release 16)," 3GPP TS 29.212, V16.1.0, pp. 1-285 (Sep. 2019).

Notification of Transmittal of the International Search Report and the Written Opinion of the International Searching Authority, or the Declaration for International Application Serial No. PCT/US2019/028814 (dated Aug. 20, 2019).

Applicant-Initiated Interview Summary for U.S. Appl. No. 16/100,172 (dated Jul. 18, 2019).

Notice of Allowance and Fee(s) Due and Examiner-Initiated Interview Summary for U.S. Appl. No. 15/376,631 (dated Jul. 2, 2019).

"New Annex for the SEPP in TR 33.926," 3GPP TSG-SA WG3 Meeting #95-BIS, pp. 1-6 (Jun. 24-28, 2019).

(56) References Cited

OTHER PUBLICATIONS

"Technical Specification Group Core Network and Terminals; Mobile Application Part (MAP) specification (Release 15)," 3GPP TS 29.002, V15.5.0, pp. 1-1024 (Jun. 2019).
Non-Final Office Action for U.S. Appl. No. 15/666,300 (dated Jun. 27, 2019).
Decision on Appeal for U.S. Appl. No. 13/047,287 (dated Jun. 18, 2019).
Notification of Transmittal of the International Search Report and the Written Opinion of the International Searching Authority, or the Declaration for International Patent Application No. PCT/US2019/018990 (dated May 8, 2019).
Commonly-assigned, co-pending U.S. Appl. No. 16/379,488 for "Methods, Systems, and Computer Readable Media for Dynamically Learning and Using Foreign Telecommunications Network Mobility Management Node Information for Security Screening," (Unpublished, filed Apr. 9, 2019).
Non-Final Office Action for U.S. Appl. No. 16/100,172 (dated Apr. 11, 2019).
Notice of Allowability for U.S. Appl. No. 16/035,008 (dated Mar. 18, 2019).
Notice of Allowance and Fee(s) Due for U.S. Appl. No. 16/035,008 (dated Jan. 18, 2019).
Advisory Action Before the Filing of an Appeal Brief and AFCP 2.0 Decision for U.S. Appl. No. 15/376,631 (dated Dec. 19, 2018).
Notice of Allowance and Fee(s) Due and Applicant-Initiated Interview Summary for U.S. Appl. No. 15/408,155 (dated Oct. 31, 2018).
Sahu et al., "How 5G Registration Works," http://5gblogs.com/5g-registration/, 10 pages (Oct. 12, 2018).
Notification of Transmittal of the International Search Report and the Written Opinion of the International Searching Authority, or the Declaration for International Patent Application No. PCT/US2018/043985 (dated Oct. 9, 2018).
Final Office Action for U.S. Appl. No. 15/376,631 (dated Oct. 5, 2018).
Notice of Allowance and Fee(s) Due for U.S. Appl. No. 15/636,118 (dated Oct. 3, 2018).
"5G; Procedures for the 5G System (3GPP TS 23.502 version 15.3.0 Release 15)," ETSI TS 123 502, V15.3.0, pp. 1-330 (Sep. 2018).
Notification of Transmittal of the International Search Report and the Written Opinion of the International Searching Authority, or the Declaration for International Application No. PCT/US2018/030319 (dated Aug. 20, 2018).
Final Office Action for U.S. Appl. No. 15/408,155 (dated Jul. 26, 2018).
Notice of Allowance and Fee(s) Due for U.S. Appl. No. 15/636,118 (dated Apr. 27, 2018).
"N32 message anti-spoofing within the SEPP," 3GPP TSG SA WG3 (Security), Meeting #91, pp. 1-2 (Apr. 16-20, 2018).
Non-Final Office Action for U.S. Appl. No. 15/376,631 (dated Apr. 18, 2018).
"Signalling Security in Telecom SS7/Diameter/5G," Enisa, pp. 1-30 (Mar. 2018).
Examiner's Answer for U.S. Appl. No. 13/047,287 (dated Feb. 26, 2018).
Advisory Action Before the Filing of an Appeal Brief and AFCP 2.0 Decision for U.S. Appl. No. 15/376,631 (dated Feb. 2, 2018).
Non-Final Office Action for U.S. Appl. No. 15/408,155 (dated Jan. 9, 2018).
Final Office Action for U.S. Appl. No. 15/376,631 (dated Nov. 28, 2017).
"GSMA Guidelines for Diameter Firewall," NetNumber Inc., pp. 1-7 (Sep. 12, 2017).
"Oracle Communications Diameter Signaling Router Main Differentiators," Oracle White Paper, pp. 1-10 (Jul. 2017).
"LTE and EPC Roaming Guidelines," GSM Association, Official Document IR.88, V 16.0, pp. 1-90 (Jul. 5, 2017).
Non-Final Office Action for U.S. Appl. No. 15/376,631 (dated Jun. 16, 2017).

"LTE International Roaming Whitepaper," http://carrier.huawei.com/en/technical-topics/core-network/lte-roaming-whitepaper, pp. 1-16 (Downloaded May 12, 2017).
"Digital cellular telecommunications system (Phase 2+) (GSM); Universal Mobile Telecommunications System (UMTS); Universal Geographical Area Description (GAD) (3GPP TS 23.032 V 14.0.0 Release 14)," ETSI TS 123 032 V14.0.0, pp. 1-30 (May 2017).
Final Office Action for U.S. Appl. No. 13/047,287 (dated Mar. 10, 2017).
"3rd Generation Partnership Project; Technical Specification Group Services and System Aspects; Functional stage 2 description of Location Services (LCS) (Release 14)," 3GPP TS 23.271 V14.1.0, pp. 1-181 (Mar. 2017).
"Digital cellular telecommunications system (Phase 2+) (GSM); Universal Mobile Telecommunications System (UMTS); LTE; Cx and Dx interfaces based on the Diameter protocol; Protocol details (3GPP TS 29.229 V 13.1.0 Release 13)," ETSI TS 129 229 V13.1.0, pp. 1-42 (Jan. 2017).
"Edge Router (DEA)," Mavenir, pp. 1-7 (2017).
Non-Final Office Action for U.S. Appl. No. 13/047,287 (dated Aug. 25, 2016).
"Digital cellular telecommunications system (Phase 2+); Universal Mobile Telecommunications System (UMTS); Numbering, addressing and identification (3GPP TS 23.003 V 12.9.0 Release 12)," ETSI TS 1 23 003 V12.9.0, pp. 1-93 (Mar. 2016).
"Syniverse Guide to LTE Roaming and Interoperability," https://www.syniverse.com/assets/files/custom_content/lte-roaming-interoperability-guide.pdf, pp. 1-11 (Jan. 8, 2016).
"Digital cellular telecommunications system (Phase 2+) (GSM); Universal Mobile Telecommunications System (UMTS); LTE; Location Services (LCS); LCS Application Protocol (LCS-AP) between the Mobile Management Entity (MME) and Evolved Serving Mobile Location Centre (E-SMLC); SLs interface (3GPP TS 29.171 V 11.4.0 Release 11)," ETSI TS 129 171 V11.4.0, pp. 1-52 (Jan. 2016).
"Diameter Signaling Control (DSC)," https://www.extent.com/diameter-signaling-control-dsc/, pp. 1-3 (Copyright 2016).
Kotte, "Analysis and Experimental Verification of Diameter Attacks in Long Term Evolution Networks," http://www.diva-portal.org/smash/get/diva2:951619/FULLTEXT01.pdf, pp. 1-72 (2016).
Advisory Action Before the Filing of an Appeal Brief for U.S. Appl. No. 13/047,287 (dated Oct. 16, 2015).
"The Dialogic® Helix™ Signaling Controller," https://www.dialogic.com/-/media/products/docs/brochures/14090-helix-br.pdf, pp. 1-5 (Aug. 2015).
Final Office Action for U.S. Appl. No. 13/047,287 (dated Jun. 4, 2015).
Dekok, "The Network Access Identifier," Internet Engineering Task Force (IETF), RFC 7542, pp. 1-30 (May 2015).
"Digitial cellular telecommunications system (Phase 2+); Universal Mobile Telecommunications System (UMTS); LTE; Location Services (LCS); Evolved Packet Core (EPC) LCS Protocol (ELP) between the Gateway Mobile Location Centre (GMLC) and the Mobile Management Entity (MME); SLg interface (3GPP TS 29.172 version 9.6.0 Release 9),"ETSI TS 129 172, V9.6.0, pp. 1-27 (Apr. 2015).
"Digital cellular telecommunications system (Phase 2+); Universal Mobile Telecommunications System (UMTS); LTE; Location Services (LCS); Diameter-based SLh interface for Control Plane LCS (3GPP TS 29.173 version 12.2.0 Release 12)," ETSI TS 129 173, V12.2.0., p. 1-20 (Oct. 2014).
Non-Final Office Action for U.S. Appl. No. 13/047,287 (dated Sep. 25, 2014).
Supplemental Notice of Allowance and Fee(s) Due for U.S. Appl. No. 12/823,559 (dated Aug. 23, 2013).
Notice of Allowance and Fee(s) Due for U.S. Appl. No. 12/823,559 (dated Aug. 1, 2013).
Email to U.S. Patent and Trademark Office dated Jun. 28, 2013.
Final Office Action for U.S. Appl. No. 12/823,559 (dated Apr. 11, 2013).
Final Office Action for U.S. Appl. No. 13/047,287 (dated Jan. 31, 2013).

(56) References Cited

OTHER PUBLICATIONS

Non-Final Office Action for U.S. Appl. No. 12/823,559 (dated Nov. 14, 2012).
"Digital cellular telecommunications system (Phase 2+); Universal Monile Telecommunications System (UMTS); LTE; Location Services (LCS); Service description; Stage1 (3GPP TS 22.071 V 11.0.0 Release 11," ETSI TS 122 071 V11.0.0, pp. 1-50 (Oct. 2012).
Restriction and/or Election Requirement for U.S. Appl. No. 12/823,559 dated (dated Aug. 27, 2012).
Notice of Allowance and Fee(s) due for U.S. Appl. No. 12/581,739 (dated Aug. 8, 2012).
Non-Final Office Action for U.S. Appl. No. 13/047,287 (dated Jun. 6, 2012).
Notice of Allowance and Fee(s) Due and Examiner-Initiated Interview Summary for U.S. Appl. No. 12/581,739 (dated May 15, 2012).
Non-Final Office Action for U.S. Appl. No. 12/722,460 (dated Apr. 9, 2012).
"3rd Generation Partnership Project; Technical Specification Group Services and System Aspects; Telecommunication management; Charging management; Diameter charging applications (Release 11)," 3GPP TS 32.299, V11.3.0, pp. 1-150 (Mar. 2012).
Croft, N., "On Forensics: A Silent SMS Attack," Information and Computer Security Architectures (ICSA) Research Group, Department of Computer Science, pp. 1-4, University of Pretoria, South Africa (2012).
"NET-NET Diameter Director," http://www.oracle.com/us/industries/communications/net-net-diameter-director-ds-1985034.pdf, pp. 1-9 (Copyright 2012).
Final Office Action for U.S. Appl. No. 12/581,739 (dated Dec. 30, 2011).
"3rd Generation Partnership Project; Technical Specification Group Core Network and Terminals; Policy and Charging Control (PCC) over Gx/Sd reference point (Release 11)," 3GPP TS 29.212, V11.3.0, pp. 1-171 (Dec. 2011).
Non-Final Office Action for U.S. Appl. No. 12/581,739 (dated Aug. 26, 2011).
Press Release, "SmartSynch SmartMeters Communicate Using the Largest and Most Available Wireless Networks in the World," http://www.smartsynch.com/SmartSynch_gprs.htm, pp. 1-2 (Downloaded from the Internet on Jul. 5, 2011).
"Solution: Itron CENTRON GPRS," Data Sheet, http://www.smartsynch.com/SmartSynch_itron_centron.htm, pp. 1-3 (Downloaded from the Internet on Jul. 5, 2011).
Myers, "SmartSynch Introduces Innovative 'DCX' Smart Grid Solution at DistribuTECH," SmartSynch News, http://www.appmesh.com/news/020309.htm, pp. 1-3 Feb. 3, 2009 (Downloaded from the Internet on Jul. 5, 2011).
"NES System Architecture," Data Sheet, Copyright 2009, pp. 1-2 (Downloaded from the Internet on Jul. 5, 2011).
"Wireless M-Bus and ZigBee®-enabled GSM/GPRS/ EDG Gateway for Smart Metering Introduced," Metering.com, http://www.metering.com/node/13550 Sep. 19, 2008, pp. 1-2 (Downloaded from the Internet on Jul. 5, 2011).
Constantin, L., "Remote SMS attack can force mobile phones to send premium-rate text messages: Applications installed by operators on SIM cards can be exploited remotely for SMS fraud and DoS purposes," IDG News Service, Dec. 19, 2011, pp. 1-5, IDG Communications, Inc., United States.
Notification of Transmittal of the Internatioanl Search Report and the Written Opinion of the International Searching Authority, or the Declaration for International Application No. PCT/US2010/027043 (dated Oct. 19, 2010).
"Draft LS on network verification of UE provided location," 3GPP TSG SA WG2 Meeting #81, pp. 1 (Oct. 11-15, 2010).
Notification of Transmittal of the International Search Report and the Written Opinion of the International Searching Authority, or the Declaration for International Application No. PCT/US2009/061187 (dated May 17, 2010).
Press Release, "Echelon and T-Mobile Announce Alliance to Reduce the Cost of a Secure Smart Grid Network for Utilities," Echelon Corp., https://www.tdworld.com/smart-utility/article/20956244/echelon-and-tmobile-announce-alliance-to-reduce-the-cost-of-a-secure-smart-grid-network-for-utilities, p. 1-10 (May 14, 2009).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 8)," 3GPP TS 29.272, V8.1.1, pp. 1-57 (Jan. 2009).
"3rd Generation Partnership Project; Technical Specification Group Core Network; Unstructured Supplementary Service Data (USSD); Stage 2 (Release 8)," 3GPP TS 23.090, V8.0.0, pp. 1-32 (Dec. 2008).
"3rd Generation Partnership Project; Technical Specification Group Services and System Aspects; Unstructured Supplementary Service Data (USSD)—Stage 1 (Release 8)," 3GPP TS 22.090, V8.0.0, pp. 1-10 (Dec. 2008).
"Digital cellular telecommunications system (Phase 2+); Universal Mobile Telecommunications System (UMTS); Circuit Switched (CS) fallback in Evolved Packet System (EPS); Stage 2 (3GPP TS 23.272 V 8.0.0 Release 8)," ETSI TS 123 272 V8.0.0, pp. 1-42 (Nov. 2008).
Dierks et al., "The Transport Layer Security (TLS) Protocol Version 1.2," RFC 5246, pp. 1-208 (Aug. 2008).
3rd Generation Partnership Project "Technical Specification Group Core Network and Terminals; Study into routeing of MT-SMs via the HPLMN (Release 7)," 3GPP TR 23.840 V7.1.0 (Mar. 2007).
Hakala et al., "Diameter Credit-Control Application," RFC 4006, pp. 1-115 (Aug. 2005).
Housley et al., "Internet X.509 Public Key Infrastructure Certificate and Certificate Revocation List (CRL) Profile," RFC 3280, pp. 1-258 (Apr. 2002).
Non-Final Office Action for U.S. Appl. No. 17/125,943 (dated Feb. 9, 2023).
Supplemental Notice of Allowability for U.S. Appl. No. 17/076,482 (dated Jan. 19, 2023).
Non-Final Office Action for U.S. Appl. No. 17/129,441 (dated Jan. 19, 2023).
Intent to Grant for European Patent Application No. 18705270.9 (dated Dec. 8, 2022).
Non-Final Office Action for U.S. Appl. No. 17/099,683 (dated Jan. 4, 2023).
Telekom, "N32 Message Anti-Spoofing within the SEPP", 3GPP TSG SA WG3 (Security) Meeting #91, S3-181480, pp. 1-2 (Apr. 2018).
Huawei, "New Annex for the SEPP in TR 33.926", 3GPP TSG-SA WG3 Meeting #95-BIS, S3-192180, pp. 1-5 (Jun. 2019).
"5G; 5G System; Public Land Mobile Network (PLMN) Interconnection; Stage 3 (3GPP TS 29.573 Version 16.3.0 Release 16)," ETSI TS 129 573, V16.3.0, pp. 1-93 (Jul. 2020).
Communication under Rule 71(3) EPC Intention to Grant for European Patent Application Serial No. 20 720 580.8 (dated Dec. 23, 2022).
Non-Final Office Action for U.S. Appl. No. 17/095,420 (dated Jan. 3, 2023).
Applicant-Initiated Interview Summary for U.S. Appl. No. 17/099,683 (dated Dec. 12, 2022).
Notice of Allowance and Fee(s) Due for U.S. Appl. No. 17/076,482 (dated Dec. 1, 2022).
Notice to Grant for Japanese Patent Application Serial No. 2021-500828 (dated Nov. 25, 2022).
Examination Report for Indian Application Serial No. 202247032585 (dated Nov. 15, 2022).
Non-Final Office Action for Chinese Patent Application Serial No. 202080091056.6 (dated Oct. 27, 2022).
Non-Final Office Action for U.S. Appl. No. 17/008,528 (dated Nov. 10, 2022).
Notification of reasons for refusal for Japanese Patent Application No. 2020-572898 (dated Oct. 25, 2022).
Advisory Action for U.S. Appl. No. 17/076,482 (dated Oct. 25, 2022).

(56) References Cited

OTHER PUBLICATIONS

Final Office Action and Applicant-Initiated Interview Summary for U.S. Appl. No. 17/099,683 (dated Oct. 24, 2022).
Communication of European publication No. and information on the application of Article 67(3) EPC for European Patent Application No. 20842462.2 (dated Oct. 12, 2022).
Decision to grant a European patent pursuant to Article 97(1) EPC for European Patent Application Serial No. 19749059.2 (dated Sep. 29, 2022).
Decision to Grant for Japanese Patent Application Serial. No. 2020-505462 (dated Aug. 2, 2022).
Non-Final Office Action for U.S. Appl. No. 17/123,038 (dated Sep. 30, 2022).
Communication of European publication number and information on the application of Article 67(3) EPC for European Patent Application Serial No. 20720580.8 (dated Jan. 19, 2022).
"5G; Architecture enhancements for 5G System (5GS) to support network data analytics services (3GPP TS 23.288 version 16.4.0 Release 16)," ETSI TS 123 288, V16.4.0, pp. 1-68 (Jul. 2020).

* cited by examiner

| Sample Schema | MCC | MNC | LAC | Cell ID | Long | Lat | Last updated |
|---|---|---|---|---|---|---|---|
| Sample Data for Amritsar | 404 | 5 | 221 | 2171 | 70.38 | 20.91 | 1459669222 |
| Sample Data for Lahore | 400 | 6 | 219 | 21771 | 72.10 | 21.91 | 1459669200 |

FIG. 4

METHODS, SYSTEMS, AND COMPUTER READABLE MEDIA FOR CONDUCTING A VELOCITY CHECK FOR OUTBOUND SUBSCRIBERS ROAMING TO NEIGHBORING COUNTRIES

TECHNICAL FIELD

The subject matter described herein relates to fraud prevention in mobile communications networks. More particularly, the subject matter described herein relates to methods, systems, and computer readable media for conducting a velocity check for outbound subscribers roaming to neighboring countries.

BACKGROUND

Mobile communications networks are expanding and utilize multiple technologies and interconnects to carry signaling messages used to establish communications over the networks. Home network elements of a core network are typically not connected to foreign or visited networks. In some instances, a velocity check is utilized to validate if a subscriber has traveled between two locations within a specified time period at present, the source and destination of a subscriber's movement can be identified using the latitude and longitude of the capital city of the country identified by a country code in the global title address. However, methods such as this results in false positives (e.g., inaccurate designation of suspicious ingress messages by traditional velocity checks) when neighboring countries allow fake registrations in the network. As such, a velocity check is not typically performed when neighboring countries are involved. There is a separate database of neighboring countries maintained on many network gateways, such that when there is a message received from one of the listed neighboring countries, the conventional velocity check algorithm is disabled, thereby allowing messages from neighboring countries to enter the home network without any validation or checks. As an example, if a subscriber was in Punjab, India and subsequently traveled to Lahore, Pakistan, the distance between these two cities is approximately 50 kilometers and is possible to travel in less than 60 minutes. However, networks are currently configured with logic that would currently calculate the distance between Delhi, India and Islamabad, Pakistan which equals approximately 450 kilometers. Notably, this 450 kilometers distance cannot be traveled in under 60 minutes. Consequently, present systems would assess this distance and subsequently discard the received message. Thus, in the scenario involving neighboring countries, even though the distance traveled between borders maybe small and takes less time, a legitimate message may be discarded if the existing/current velocity check logic is applied. In particular, false positives involved with neighboring countries is a major concern with all firewall and gateway vendors in the market today.

Accordingly, there exists a need for methods, systems, and computer readable media for conducting a velocity check for subscribers roaming to neighboring countries.

SUMMARY

The subject matter described herein includes a methods, systems, and computer readable media for conducting a velocity check for outbound subscribers roaming to neighboring countries. One method includes receiving, by a network gateway associated with a home network located in a home country from a mobile switching center (MSC) associated with a visited network located in a foreign country that neighbors the home country, an ingress signaling message related to a mobile device roaming in the visited network, sending, to a home location register (HLR) in the home network, an interrogation request message containing a mobile subscriber identifier associated with the mobile device, and receiving an interrogation response message containing age of location information and cell identifier information corresponding to the mobile subscriber identifier. The method further includes utilizing the cell identifier information to determine a first geographic reference position and a country code identifier included in the ingress signaling message to determine a second geographic reference position, determining an estimated transit time of the mobile device using the first geographic reference position and the second geographic reference position, and comparing age of location information with the estimated transit time to determine if the ingress signaling message is to be forwarded to the HLR.

In at least one embodiment of the disclosed method, the ingress signaling message includes a location update message or a send authentication identification (SAI) message.

In at least one embodiment of the disclosed method, the interrogation request message is a mobile application part (MAP) AnyTimeInterrogation message (ATI) request message and the interrogation response message is a MAP ATI response message.

In at least one embodiment of the disclosed method, the estimated transit time is determined by using the first geographic reference position and the second geographic reference position as inputs into a haversine formula.

In at least one embodiment of the disclosed method, the ingress signaling message is forwarded by the network gateway to the HLR in response to determining that the estimated transit time value is less than the age of location information.

In at least one embodiment, the disclosed method includes rejecting, by the network gateway, the ingress signaling message in response to determining that the estimated transit time value is greater than the age of location information.

In at least one embodiment, the disclosed method includes sending, by the network gateway, an alert message to a network operator in response to determining that the estimated transit time value is greater than the age of location information.

A system for conducting a velocity check for outbound subscribers roaming to neighboring countries includes a network gateway including at least one processor, wherein the network gateway is associated with a home network located in a home country and a location mapping database for storing geographic reference position data that is mapped to a plurality of cell identifiers. The system further includes a velocity check engine in the network gateway and implemented using the at least one processor for receiving, from a MSC associated with a visited network located in a foreign country that neighbors the home country, an ingress signaling message related to a mobile device roaming in the visited network, sending, to a HLR in the home network, an interrogation request message containing a mobile subscriber identifier associated with the mobile device, receiving an interrogation response message containing age of location information and cell identifier information corresponding to the mobile subscriber identifier, utilizing the cell identifier information to determine a first geographic reference position and a country code identifier included in the ingress signaling message to determine a second geographic reference position, determining an estimated transit time of the mobile device using the first geographic reference position and the second geographic reference position, and determining if the ingress signaling message is to be forwarded to the HLR by comparing age of location information with the estimated transit time.

In at least one embodiment of the disclosed system, the ingress signaling message includes a location update message or a send authentication identification (SAI) message.

In at least one embodiment of the disclosed system, the interrogation request message is a mobile application part (MAP) AnyTimeInterrogation message (ATI) request message and the interrogation response message is a MAP ATI response message.

In at least one embodiment of the disclosed system, the estimated transit time is determined by using the first geographic reference position and the second geographic reference position as inputs into a haversine formula.

In at least one embodiment of the disclosed system, the ingress signaling message is forwarded by the network gateway to the HLR in response to determining that the estimated transit time value is less than the age of location information.

In at least one embodiment of the disclosed system, the network gateway is configured to reject the ingress signaling message in response to determining that the estimated transit time value is greater than the age of location information.

In at least one embodiment of the disclosed system, the network gateway is configured to send an alert message to a network operator in response to determining that the estimated transit time value is greater than the age of location information.

The subject matter described herein may be implemented in hardware, software, firmware, or any combination thereof. As such, the terms "function" "node" or "engine" as used herein refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

The following terminology is used to describe the subject matter described herein for conducting a velocity check for outbound subscribers roaming to neighboring countries:

Outbound roaming subscribers: Home network subscribers roaming in a foreign network (e.g., a visited or foreign network).

Inbound roaming subscribers: Foreign network mobile subscribers roaming into the home network of the mobile network operator (MNO).

Home network: a network where operated by a mobile network operator with which a mobile subscriber has a subscriber subscription agreement.

Visited network: a foreign network located in a foreign country in which a visiting mobile subscriber is roaming.

Location update (LU): A mobile application part (MAP) signaling message used to update the location of a subscriber in an HLR.

Send Authentication Information (SAI) request: A MAP signaling message used to authenticate the subscriber using HLR information.

International mobile subscriber identity (IMSI): unique identity of a mobile subscriber.

BRIEF DESCRIPTION OF THE DRAWINGS

FIG. 4 is a block diagram of a cell identifier mapping database table utilized for conducting a velocity check for outbound subscribers roaming to neighboring countries according to an embodiment of the subject matter described herein.

DETAILED DESCRIPTION

Figure 1:
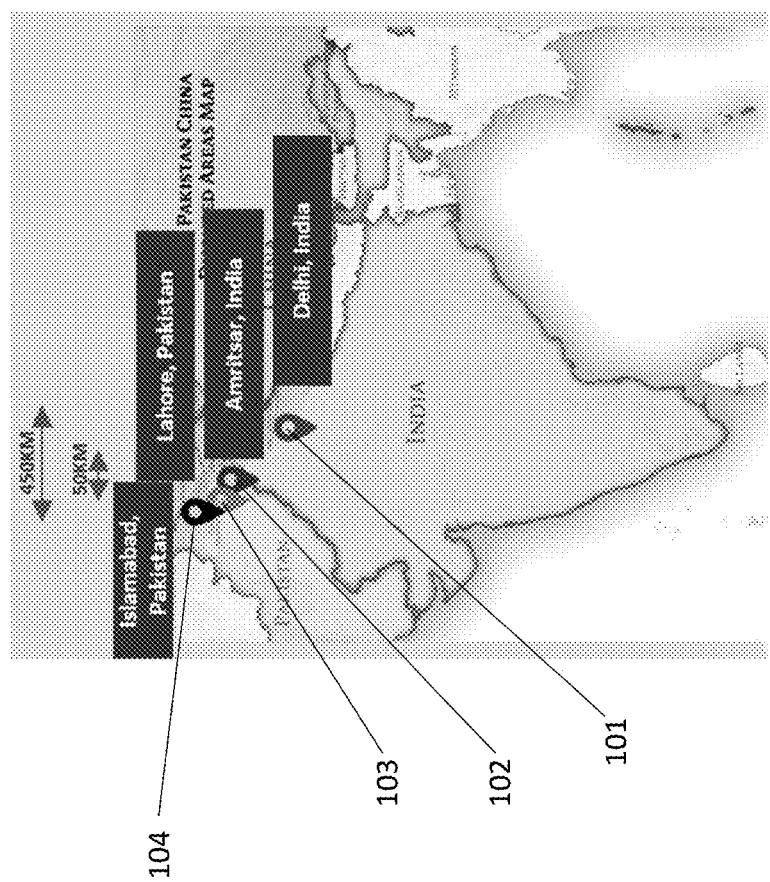
FIG. 1 illustrates an image of an exemplary map of two bordering countries according to an embodiment of the subject matter described herein.

Methods, systems, and computer readable media for conducting a velocity check security measure for mobile subscribers roaming to neighboring countries are disclosed. In particular, the disclosed subject matter presents a method and system that implements an improved velocity check security measure implemented at the network gateway and/or firewall node when the mobile subscriber roams outside of the home network and into a visited network that is located in a neighboring country.

As described herein, the improved velocity check includes a security measure that is used to mitigate the occurrence of false positives that occur when a user equipment (e.g., mobile device) belonging to a mobile subscriber roams from a first home country to a second neighboring country. In some embodiments, a velocity check (e.g., a time distance check) is a security measure that determines if a mobile subscriber is physically capable of traveling or roaming from the first country (i.e., the country associated with the mobile subscriber's home network) to a second neighboring country (i.e., a foreign country neighboring the home country) within an estimated transit time (i.e., a predefined amount of transit time that has been determined to be likely or possible). In particular, the velocity check security measure can be applied to an outbound roaming mobile subscriber leaving a home network in a home country and is configured to use the cell identifier of a most recent cell or cell tower that can be compared with a capital city location corresponding to a current country in which the mobile subscriber is actually located. The velocity check security measure further determines if it is physically possible for a mobile subscriber to travel from the most recent cell location to the current capital city location in the estimated amount of time. In some embodiments, the determination can be achieved by maintaining a location mapping database in a network gateway (or firewall) that maps cell identifiers with a geographic reference position (e.g., longitude and latitude reference position). In particular, if a mobile subscriber moves from a first country to a second neighboring country and the estimated transit time is found to be less than age of location information (as described below), then the network gateway will detect and mark the current ingress signaling message (e.g., SAI/LU message) from the visited network in the foreign neighboring country as being potentially suspicious.

For example, after a velocity check engine calculates that the minimum estimated transit time required for a mobile subscriber to travel from a Reference Point A (in a home network in a home country) to Reference Point B (in a visited network in a neighboring country) is two hours (i.e., 120 mins), then the velocity check engine subsequently determines whether or not that the minimum estimate transit time is greater than an age of location parameter, which represents a time duration value of that subscriber's last known activity in the home network (and home country). For example, if a SAI/LU message is received by a network gateway from a visited location at 10:00 AM and it is determined that the age of location (as indicated in a ATI response received by the network gateway) is 30 minutes (which means that the mobile subscriber was last active in the home network approximately 30 minutes ago according to the Home VLR), then problems are detected when the SAI/LU message is determined to be received from a location (e.g., capital city) which takes at least two hours to travel from Reference Point A. Ideally, the mobile subscriber should have started travelling from Reference Point A in the home network before 8:00 AM to reach Reference Point B as per the minimum travel time requirements. However, since the subscriber likely left Reference Point A in the home network 30 minutes ago, and because the age of location (i.e., 30 minutes) is considerably less than the estimated transmit time of 2 hours, the SAI/LU message would be designated as invalid. In contrast, the SAI/LU message would have been as legitimate/valid and allowed in the home network if the age of location time value (i.e., the time elapsed since the last detected activity in the home network) is greater than the estimated transit time elapsed to traverse between Reference Point A and Reference Point B (e.g., the capital city location of the visited network).

As way of example, FIG. 1 shows a map 100 of two exemplary neighboring countries, India (i.e., home country) and Pakistan (i.e., neighboring foreign country). As used herein, "neighboring countries" or "neighbor countries" are two nations or countries that share a geographic border. As shown in FIG. 1, map 100 includes two Indian cities, Delhi (see pin marker 101) and Amritsar (see pin marker 102). Likewise, map 100 in FIG. 1 shows two of Pakistani cities, Lahore (see pin marker 103) and Islamabad (see pin marker 104). Notably, some conventional velocity checks/methods utilize both the longitude-latitude position information of the capital city of the home country (e.g., reference point A) and the capital city of the neighboring foreign country (e.g., Reference point B) when determining an estimated transit time between two networks. Operating in this manner will produce a significant number of false positives (e.g., inaccurate designation of suspicious ingress signaling messages (e.g., authentication and/or registration messages) by traditional velocity checks). For example, if a mobile subscriber was registered and positioned in a home network in Amritsar 102 and subsequently roamed/traveled to Lahore 103, the actual distance traveled between the two cities would be approximately 50 kilometers, which can be traversed in less than 60 minutes. However, the logic utilized in most existing velocity check systems would instead calculate the distance between Delhi 101 and Islamabad 104 (i.e., the capital cities of the neighboring countries) which is approximately 450 kilometers, irrespective of the actual and/or approximate position of the mobile subscriber. Notably, this approximate 450 kilometer distance between the capital cities cannot be traveled under 60 minutes. As such, the conventional system will improperly discard an originally received SAI/LU request message. Thus, in the scenario of neighboring countries, a legitimate Send Authentication Information (SAI) request message and/or Location Update (LU) request message may be discarded even though the distance travelled between borders may be small and takes less time (if the existing velocity check logic is applied).

Figure 2:
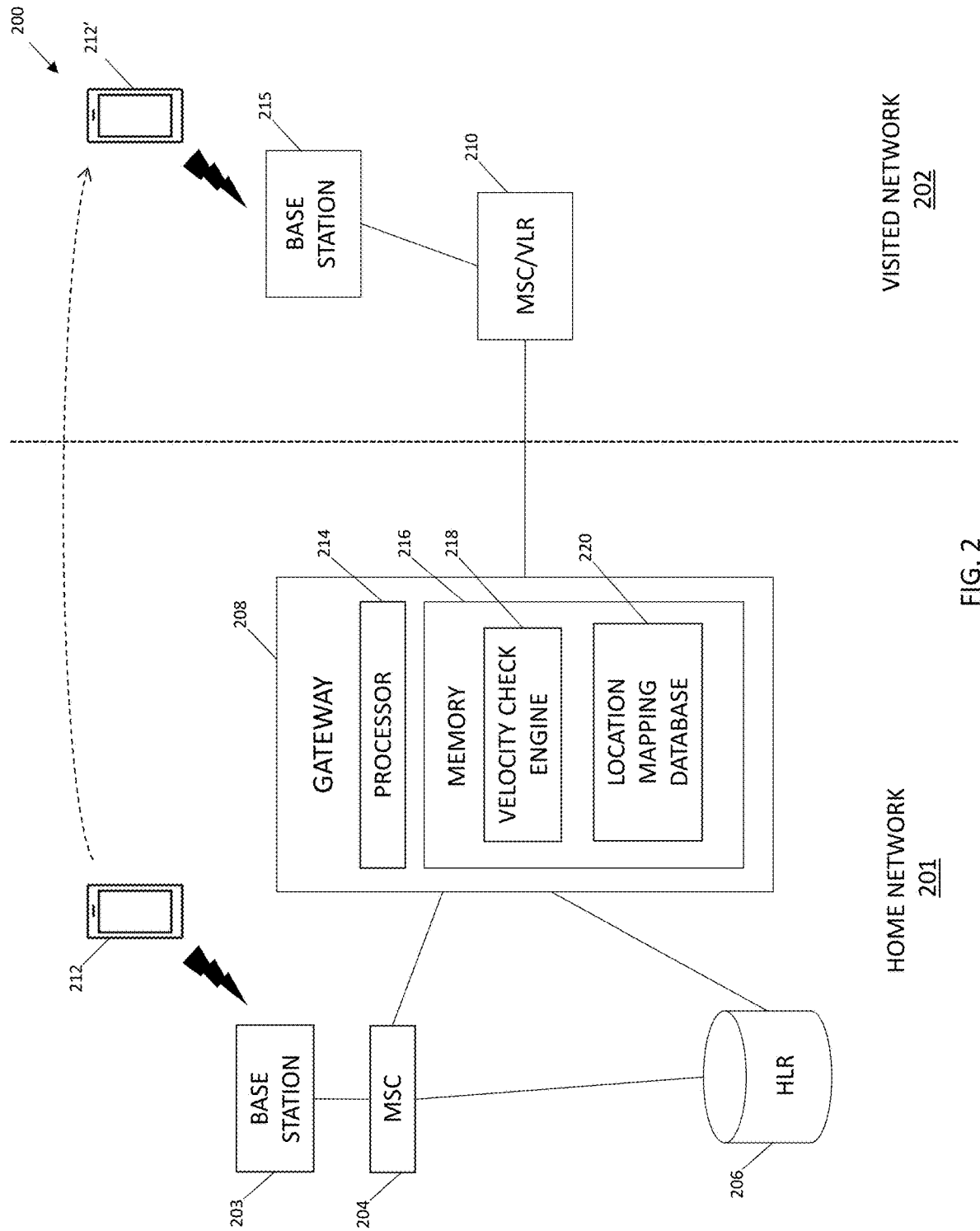
FIG. 2 is a block diagram illustrating an exemplary network for conducting a velocity check for outbound subscribers roaming to neighboring countries using a network gateway according to an embodiment of the subject matter described herein.

FIG. 2 is a block diagram illustrating an exemplary communications system 200 that is configured to facilitate the communication of Signaling System No. 7 (SS7) or Global System for Mobile Communications (GSM) based signaling messages among its network nodes. As shown in FIG. 2, communications system 200 comprises a home network 201 located in a first country (e.g., home country X) and a visited network 202 (e.g., a "foreign network" or "non-home network") located in a second country (e.g., neighboring foreign country Y). Home network 201 includes a user equipment (UE) 212, a base station 203, a mobile switching center (MSC) 204, a home location register (HLR) 206, and a network gateway 208 (e.g., a signal transfer point (STP), a firewall node, and the like).

In some embodiments, user equipment 212 may include any device that is utilized directly by a mobile subscriber end-user to receive or transmit data, such as a hand-held smart phone, a GSM mobile station, a laptop computer equipped with a mobile broadband adapter, or any other like device or user entity. In some embodiments, user equipment 212 is initially roaming in home network 201 of country X and is communicatively connected (e.g., attached) to MSC 204 via a base station 203. For example, user equipment 212 can utilize a radio interface to establish a wireless connection with base station 203, which in turn is connected to MSC 204. As used herein, base station 203 may include a base station subsystem (BSS), a base station controller (BSC), a base transceiver station (BTS), a UTMS terrestrial radio access network (UTRAN), and/or the like.

In some embodiments, MSC 204 serves as a control-node for a third generation (3G) access-network (e.g., home network 201) and manages the network switching subsystem elements of home network 201. For example, MSC 204 serves to monitor and manage the UE attachment and detachment processes. Notably, MSC 204 is responsible for selecting the network gateway(s) that service user equipment 212 at the initial attachment and during intra-network handovers. MSC 204 is also responsible for authenticating the mobile subscriber associated with user equipment 212 (e.g., by interacting with the HLR 206). Specifically, MSC 204 is communicatively coupled to HLR 206, which comprises a master subscription database for home network 201 of the subscriber user. HLR 206 notably maintains records of user equipment devices that are registered to home network 201. In some embodiments, HLR 206 serves as the main subscriber database used within a 3G network and is configured to provide mobile subscriber details to other entities within the communications system 200. The use of HLR 206 allows a network to grant or refuse user access to different services dependent on the mobile subscriber's status. As described below, HLR 206 may be configured to store cell identifier and age of location information that is mapped to a mobile subscriber identifier.

In some embodiments, both MSC 204 and HLR 206 are communicatively connected to network gateway 208. Network gateway 208 may include a router device or element (e.g., an STP) and/or a firewall node that is configured to relay signaling messages that enter into or depart from home network 201. Notably, network gateway 208 is configured to receive mobile application part (MAP) messages, including Send Authentication Information (SAI) request messages and Location Update (LU) request messages, Any Time Interrogation (ATI) request messages, and the like. Network gateway 208 is further configured to send Transaction Capabilities Application Protocol (TCAP) Error messages to an MSC or VLR in the visited network 202 in foreign country Y.

FIG. 2 further depicts a visited network 202 that is located in a foreign country (i.e., a separate and distinct from country A) and includes an MSC/VLR 210 and base station 215. MSC 210 may be similar in form and general functionality as MSC 204 (with the exception of serving visited network 202 instead of home network 201). Likewise, base station 215 is similar in form and function as base station 203 and is configured to establish a wireless connection with UEs roaming (e.g., roaming UE 212') into visited network 202.

As used herein, the term "location update request message" refers to a signaling message for updating a location of a mobile subscriber in a telecommunications network. A "location update request message" is intended to include an SS7 based location update (LU) message or any other signaling message or packets for updating the location of a telecommunications network mobile subscriber with the network. In some embodiments, the location update request message is a message that is used between an MSC and the HLR for the purposes of updating the location of the mobile subscriber's user equipment 212 within home network 201. MSC 210 can similarly direct location update request message messages to network gateway 208 in response to user equipment 212 roaming in visited network 202. Likewise, an SAI message is intended to include a MAP based subscriber authentication information request information message or any other signaling message for authentication a mobile subscriber. In some embodiments, the SAI message used between the MSC and network gateway 208 for the purposes of authenticating the mobile subscriber's user equipment 212 upon it being activated in or entering visited network 202.

Notably, each of the location update request message and SAI message includes an identifier, such as an IMSI, a Mobile Station International Subscriber Directory Number (MSISDN), and/or International Mobile Equipment Identity (IMEI), that identifies user equipment 212 and/or its mobile subscriber. The location update request message and the SAI message may also include a VLR global title (GT) address identifier, which identifies the visited network VLR that is supporting the message sender. Further, a mobile country code (MCC) identifier, which identifies the country associated with the foreign MSC/VLR, can be extracted from the VLR GT address identifier included in the location update request or SAI message by the network gateway 208. In some embodiments, the location update request message and SAI message can also include a mobile network code (MNC) identifier.

As shown in FIG. 2, network gateway 208 may include one or more processors 214, such as a central processing unit (e.g., a single core or multiple processing cores), a microprocessor, a microcontroller, a network processor, an application-specific integrated circuit (ASIC), or the like. Network gateway 208 may also include memory 216. Memory 216 may comprise random access memory (RAM), flash memory, a magnetic disk storage drive, and the like. In some embodiments, memory 216 may be configured to store a velocity check engine 218 and a location mapping database 220. Notably, velocity check engine 218 in memory 216 can perform various monitoring, management, and/or remediation functionalities for network gateway 208 when executed by one or more processors 214. In some embodiments, location mapping database 220 may reside locally in network gateway 208 as shown in FIG. 1. Alternatively, location mapping database 220 may be contained in a database host that can be accessed by, but is separate and distinct from, network gateway 208. In some embodiments, location mapping database 220 contains geographic position date that is mapped to cell identifiers, thereby affording an accuracy of up to 3-5 kilometers in radius.

In some embodiments, velocity check engine 218 can include an algorithm and/or software component that is responsible for extracting VLR GT address and/or country codes from LU messages and/or SAI messages received by network gateway 208. As described in greater detail below, network gateway 208 can receive an ingress SAI/LU message from MSC/VLR 210 in response to user equipment 212' entering or being activated in visited network 202 in neighboring country B. For the purposes of this example, it is understood that user equipment 212 was originally located in country X (e.g., attached to home network 201) at some time prior to entering visited network 202 in neighboring country Y.

In response to receiving the SAI/LU message, network gateway 208 initiates velocity check engine 218, which is configured to extract the VLR GT address from the received message and subsequently obtain the MCC from the VLR GT address information. Velocity check engine 218 may be further configured to use the MCC to determine whether the sending MSC/VLR is in a foreign country (e.g., compare the MCC with the country code associated with home network 201). If velocity check engine 218 determines that the sending MSC/VLR is located in a neighboring country, velocity check engine 218 may determine the latitude and longitude position of the capital city of the neighboring country (e.g., referencing a database containing mappings of country codes and latitude and longitude position data). Afterwards, velocity check engine 218 is configured to generate an ATI request message that includes the IMSI corresponding to the sending mobile subscriber user equipment. Notably, the IMSI may be contained in the SAI/LU message originally received by network gateway 208.

In response to receiving the ATI request message from network gateway 208, the HLR 206 is configured to generate an ATI response message that includes the stored cell ID information and age of location information associated with user equipment 212. In some embodiments, the age of location information is a value measured in minutes (and/or seconds) and represents the amount of time elapsed since the last activity conducted by the mobile subscriber and/or the mobile device (e.g., a location update caused by roaming into a visited network) In some embodiments, HLR 206 is configured with a location update time that defines the last received location update message and/or the last known activity of the mobile subscriber (i.e., age of location parameter). This age of location value should be greater than an estimated time taken to travel to a visited network (as described in greater detail below). HLR 206 may then send the generated ATI response message containing the cell identifier information and age of location information to the network gateway 208.

In response to receiving the ATI response message, network gateway 208 (and/or velocity check engine 218) extracts the cell identifier information from the ATI response message and subsequently accesses location mapping database 220 to obtain the corresponding/mapped geographic reference position information, such as latitude and longitude position information (as described in greater detail below). Further, network gateway 208 (and/or velocity check engine 218) can use the country code identifier to access a database containing geographic reference position information corresponding to the capital city of the neighboring country. Using these two geographic reference points as inputs into an algorithm (e.g., a haversine formula), a distance value is determined. Network gateway 208 (and/or velocity check engine 218) is configured to determine an estimated transit time (as described further below).

Once the estimated transit time is calculated, velocity check engine 218 can access location mapping database 220 to compare the estimated transit time value with the age of location parameter/value contained in the ATI response message. If velocity check engine 218 determines that the estimated transit time is less than the age of location value, velocity check engine 218 can designate or tag the ingress SAI/LU signaling message received from MSC 210 as being potentially suspicious. In contrast, if velocity check engine 218 determines that the estimated transit time is greater than or equal to the age of location value, velocity check engine 218 can designate or tag the ingress SAI/LU signaling message received from MSC 210 as safe and can subsequently forward the ingress signaling message to HLR 206.

Figure 3A:
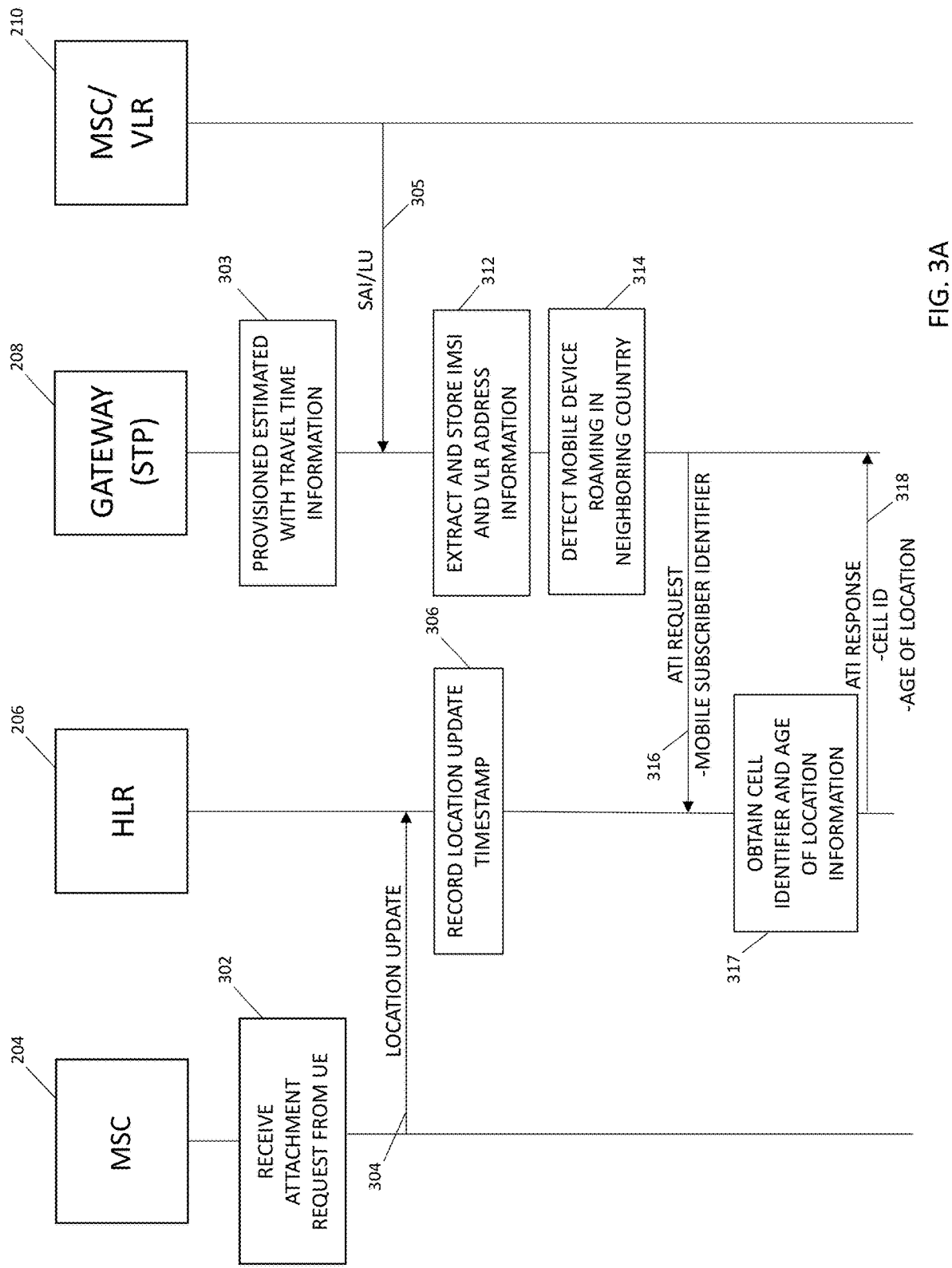
FIGS. 3A and 3B depict a signaling diagram illustrating the communication of messages for conducting a velocity check for outbound subscribers roaming to neighboring countries according to an embodiment of the subject matter described herein.
Figure 3B:
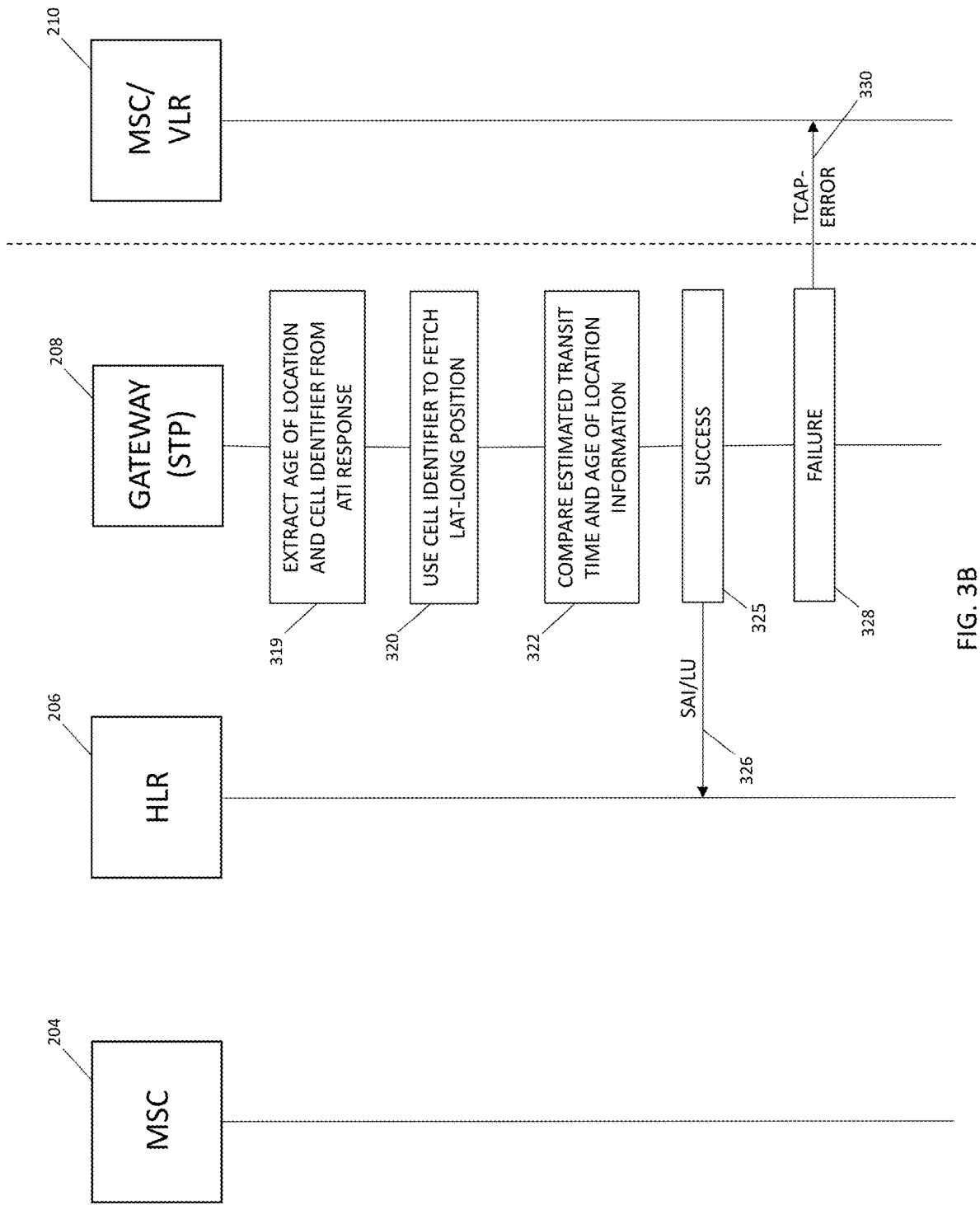

FIGS. 3A and 3B depict a signaling diagram illustrating the communication of messages for conducting a velocity check for outbound subscribers roaming to neighboring countries according to an embodiment of the subject matter described herein. Referring to FIG. 3A, a user equipment (e.g., mobile device) may enter or be activated in the associated mobile subscriber's home network (e.g., in the home country). In response, the user equipment sends an attachment request message to home network MSC 204 (e.g., see block 302) via a base station (not shown). After receiving the attachment request message, home network MSC 204 generates and sends a location update message 304 to HLR 206 in the home network (which is located in the home country).

After sending the LU message 304 to HLR 206, MSC 204 records a timestamp of when LU message 304 was sent and/or the attachment of the UE (see block 306). Similarly, HLR 206 generates a record indicating MSC 204 as being the MSC serving the attached user equipment (i.e., stores the MSC identification and/or address information which is mapped to a user equipment identifier).

At some later point in time after the attachment of the user equipment in the home network, the user equipment enters a second country (e.g., neighboring foreign country Y) that neighbors the home country containing the home network. For example, the mobile subscriber roams into visited network associated with country Y that is separately located from, but neighbors the mobile subscriber's home network (e.g., in home country "X"). In a similar manner described above, the user equipment sends an attachment request message to foreign MSC/VLR 210 via a base station (not shown). In response to receiving the attachment request message, visited MSC/VLR 210 (which may also be embodied as a separate MSC and/or VLR) generates an SAI and/or LU message as part of the authentication and location update procedure. Further, foreign MSC/VLR 210 may then send the generated SAI/LU message 305 to network gateway 208 (which has a local mapping database that has been provisioned with travel time information; see box 303). After receiving the SAI/LU message 305, network gateway 208 parses the SAI/LU message 305 and extracts (and stores) the contained VLR GT address information as well as the mobile subscriber identification information (e.g., IMSI information) (see block 312). Notably, network gateway 208 (and/or velocity check engine) initially obtains a mobile country code (MCC) from the VLR GT address contained in the received SAI/LU message 305 to identify the foreign country that the UE is located. In some embodiments, network gateway 208 can utilize a velocity check engine to compare the extracted MCC with a predefined home country code value (i.e., corresponding to the country hosting the network gateway) to determine if the visited foreign country is a neighboring country with respect to the country of the home network. If the visited foreign country is determined to be a neighboring country, velocity check engine executes the following improved velocity check.

In block 314, network gateway 308 detects that the user equipment has roamed from the home network to a visited network located in a neighboring country Y. In response, network gateway 208 is configured to initiate and send an ATI request message 316 to HLR 206. In some embodiments, network gateway 308 inserts a mobile subscriber identifier (e.g., IMSI) associated with the roaming UE and/or mobile subscriber in the ATI request message 316. In some embodiments, network gateway 208 obtains address or identification information pertaining to HLR 206 by extracting the data from the received ingress SAI/LU message. In some embodiments, the SAI/LU messages contains an IMSI parameter or a called party address (CdPA) parameter that can be used to access mapped HLR identification information. After receiving ATI request message 316, HLR 206 utilizes mobile subscriber identification (e.g., IMSI) information included in ATI request message 316 to locate the stored cell identifier information associated with most recent serving cell and/or cell tower (see block 317). Moreover, HLR 206 may utilize the IMSI information to obtain age of location information corresponding to the roaming UE.

After acquiring the cell identifier information and age of location information, HLR 206 may then provide the obtained information to network gateway 208 via an ATI response message 318.

Referring to FIG. 3B, network gateway 208 can extract the cell identifier information and the age of location information (see block 319) from the ATI response message 318 and query a location mapping database. In some embodiments, the location mapping database (not shown) resides locally on, and/or is accessible by, network gateway 208. One exemplary location mapping database that is accessible by network gateway 208 and/or velocity check engine 218 is depicted as database table 400 in FIG. 4. Referring to FIG. 4, local mapping database table 400 is represented as a grid table with columns 401-408. Although database table 400 is shown having eight columns, any number of columns may be used in the database without departing from the scope of the disclosed subject matter. As shown in FIG. 4, column 401 is a "sample schema" column or city listing column. Column 402 is the MCC column. Columns 403-404 are the MMC and LAC columns, respectively. Column 405 contains the cell identifier information. Further, columns 406-407 respectively contain the longitude and latitude information that is mapped to the corresponding cell identifier(s) in column 405. Notably, the cell identifier information contained in column 405 is mapped to the longitude and latitude position information in columns 406-407. Lastly, column 408 contains the last updated information (e.g., a time value indicating when the database was last updated). Although only two cities are shown in database table 400, additional cities and neighboring countries may be represented without departing from the scope of the disclosed subject matter. It is understood that network gateway 208 is configured to also utilize a separate database that includes capital city latitude-longitude information that is mapped to MCC, MNC, and/or other country code(s) when estimating the geographic location of the sender of the original SAI/LU message 305.

Returning to FIG. 3B, network gateway 208 (and/or its velocity check engine) utilizes the cell identifier contained in the ATI response message 318 to cross-reference the entries of the location mapping database. Notably, the cell identifier is compared to the entries in column 405 (as shown in FIG. 4) until a matching cell identifier value is found. If a matching cell identifier is found, velocity check engine is configured to obtain the corresponding mapped geographical position data, such as the longitude and latitude position data contained in columns 406-407 (see, e.g., block 320). After obtaining the longitude and latitude position data, the velocity check engine is configured to designate the combination of this position data as "Reference point A".

In addition to determining this first reference point, network gateway 208 is also configured to determine a second reference point (e.g., "Reference point B") that corresponds to the latitude-longitude position location of the capital city of the neighboring country the user equipment has roamed into. For example, network gateway 208 is configured to utilize the MCC in the originally received SAI/LU request message 305 to determine the identity of the neighboring country. Using the MCC code, network gateway 208 will access a capital city location database (not shown) to obtain corresponding longitude and latitude position information that is mapped to the MCC. Notably, network gateway 208 is configured to designate the longitude and latitude position information associated with the capital city of the neighboring country as "Reference point B".

Once Reference point A and Reference point B are both designated, network gateway 208 is configured to use these two reference points as input for a haversine formula (which may be executed by velocity check engine). After processing the two reference points, velocity check engine returns the distance (e.g., miles or kilometers) that exists between the two reference points. Network gateway may then be configured to determine an estimated transit time between the two reference points. The estimated transit time may represent the shortest amount of time (e.g., in minutes and/or hours) in which a mobile subscriber (and the UE) can reasonably and/or possibly travel from one reference point to the other reference point. In some embodiments, network gateway 208 is configured to access a pre-defined average velocity value (e.g., miles/hour, kilometers/hour, etc.) that is stored locally on network gateway 208 (e.g., a local database) and/or a non-local database that is accessible by network gateway 208. For example, the network gateway (and/or velocity check engine) can be configured to query a local database or another network element to request a vSTPSccpOptions managed object (MO) parameter, which contains an average velocity parameter (e.g., a predefined and/or standard air travel velocity). This obtained average velocity parameter can be used along with the previously determined distance to calculate an estimated time of travel/transit.

After the estimated transit time value is calculated, the velocity check engine is configured to compare the estimated transit time and the age of location information obtained from the ATI response message (e.g., see block 322). If the velocity check engine determines that the estimated transit time is less than or equal to the age of location information, then the velocity check engine will establish that the velocity check is a success (e.g., see block 325). In response to the velocity check engine determining that velocity check is a success, network gateway 208 and/or velocity check engine is configured to forward the SAI/LU request message 326 (i.e., same message as original SAI/LU message 305) to HLR 206.

If the velocity check engine instead determines that the estimated transit time is greater than the age of location information, then the velocity check engine will establish that the velocity check is a failure (e.g., see block 328). In response to the velocity check engine determining that velocity check is a failure, network gateway 208 and/or its velocity check engine is configured to drop, reject, and/o block the originally received SAI/LU request message 305. In some embodiments, network gateway 208 may be configured to send a TCAP error message 330 to the MSC/VLR 210 in the neighboring country that originally sent the SAI/LU request message 305. Further, network gateway 208 may also be configured to send an alert message to a network operator or some other security measure network element in the home network.

Figure 5:
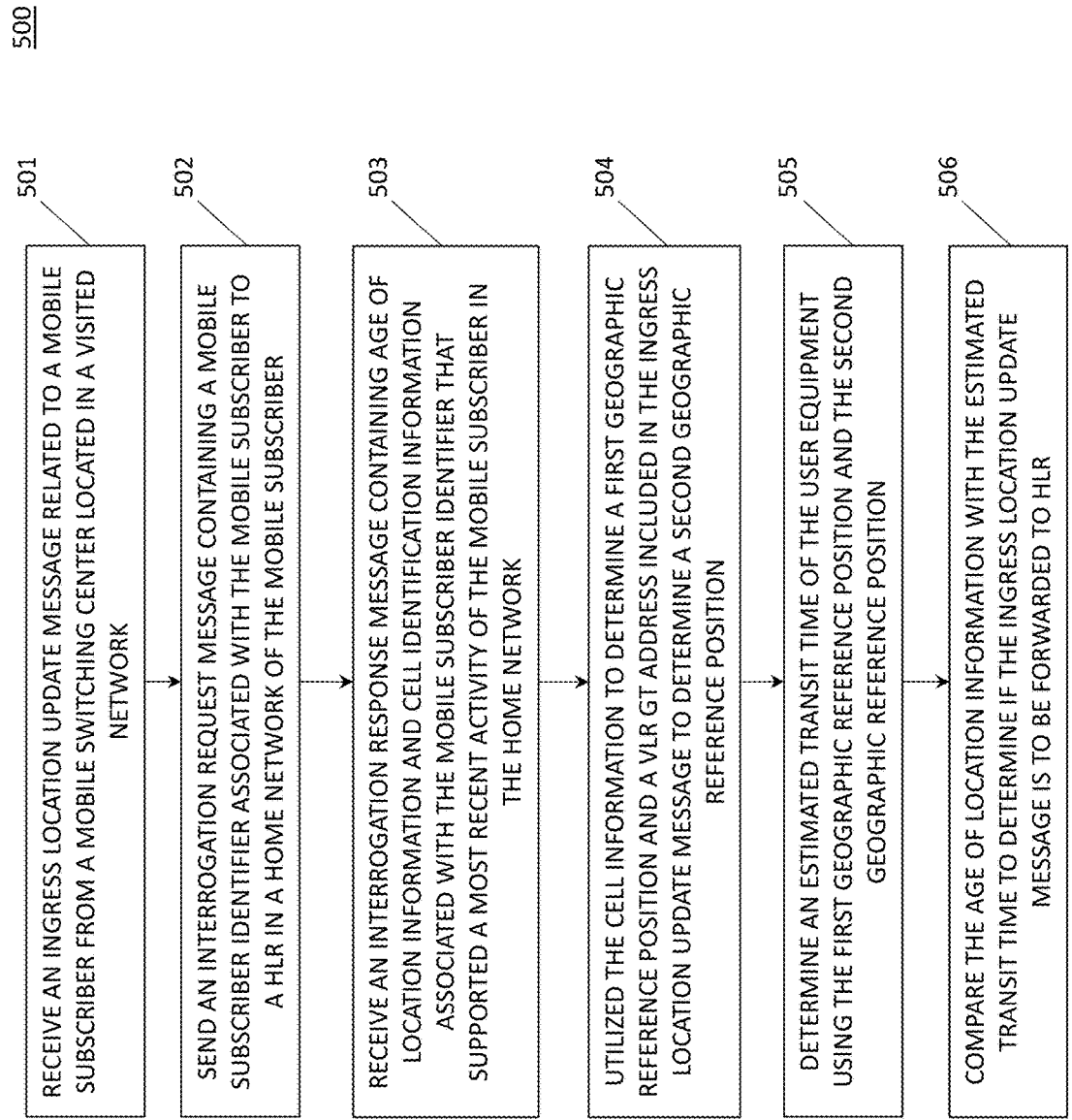
FIG. 5 is a flow chart illustrating an exemplary process for conducting a velocity check for outbound subscribers roaming to neighboring countries according to an embodiment of the subject matter described herein.

FIG. 5 is a flow chart illustrating an exemplary process or method 500 for conducting a velocity check for outbound subscribers roaming to neighboring countries according to an embodiment of the subject matter described herein. In some embodiments, method 500 depicted in FIG. 5 is an algorithm stored in memory that when executed by a hardware processor performs steps 501-506. In block 501, an ingress signaling message related to a mobile subscriber is received from an MSC located in a visited network in a neighboring foreign country. In some embodiments, the ingress signaling message received from the MSC is an SAI message or an LU message.

In block 502, an interrogation request message containing a mobile subscriber identifier associated with the mobile subscriber is sent to an HLR located in a home network of the mobile subscriber. In some embodiments, the network gateway accesses an internal database to determine the HLR serving the roaming mobile subscriber. The network gateway may determine the address for identity of the HLR by extracting a mobile subscriber identifier, such as the IMSI, from the ingress signaling message received from the foreign network MSC. The network gateway can then generate the ATI request message containing the mobile subscriber identifier (e.g., IMSI). The network gateway can also utilize the mobile subscriber identifier to determine the identity or address of the HLR. With this address information, the network gateway can direct the ATI request message to the HLR in the home network of the mobile subscriber.

In block 503, an interrogation response message is received by the network gateway. In response to receiving the ATI request message, the HLR utilizes the mobile subscriber identifier to identify the cell (and/or cell tower) that most recently provided support to the mobile subscriber's UE in the home network. The HLR also obtains age of location information corresponding to the UE. After obtaining the aforementioned cell identifier information and the age of location information, the HLR generates an ATI response message that includes this information. Further, the HLR sends the ATI response message to the network gateway.

In block 504, the cell identifier information is utilized to determine a first geographic reference position (e.g., a first latitude-longitude reference position) and a second geographic reference position (e.g., latitude-longitude reference position). In some embodiments, the velocity check engine extracts this cell identifier from the ATI response message and cross-references the cell identifier with latitude-longitude values contained in the location mapping database. The velocity check engine may also use the country code identifier contained in the original ingress SAI/LU message to obtain latitude-longitude data corresponding to the capital city of the neighboring country that the mobile device has roamed into. Notably, the velocity check engine may be configured to designate the location corresponding to the cell identifier as a first geographic reference position and the location corresponding to the capital city of the neighboring country as the second geographic reference position.

In block 505, an estimated transit time of the mobile device is determined using the first geographic reference position and the second geographic reference position. In some embodiments, the velocity check engine uses the first and second geographic reference positions as input for a haversine formula which outputs a distance. The velocity engine further utilizes the calculated distance and a travel_velocity value from an vSTPSccpOptions MO (e.g., a velocity algorithm) to calculate an estimated transit time between the two geographic reference positions In block 506, the age of location information is compared with the estimated transit time in order to determine if the ingress signaling message is to be forwarded to the HLR. in some embodiments, the velocity engine is configured to compare the age of location information obtained from the ATI response message with the estimated transit time. In the event, the velocity engine determines at the age of location value is greater than the estimated transit time, then the network gateway will forward the original SAI/LU message to the HLR. In contrast, if the velocity engine determines that the age of location value is less than the estimated transit time, the network gateway will designate the original ingress SAI/LU message as a suspicious ingress message. If the ingress signaling message is designated as a suspicious ingress message, the velocity check engine and/or the network gateway can reject or discard the ingress signaling message, thereby preventing any potentially fraudulent activity. Further, the velocity check engine can also issue an alert signal or message to a network operator in the event the ingress signaling message is designated as a suspicious ingress message. The velocity engine and/or the network gateway can also send a TCAP error message to the MSC that originally sent the ingress signaling message to the network gateway.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for conducting a velocity check for outbound subscribers roaming to neighboring countries, the method comprising:
 receiving, by a network gateway associated with a home network located in a home country from a mobile switching center (MSC) associated with a visited network located in a foreign country that neighbors the home country, an ingress signaling message related to a mobile device roaming in the visited network;
 determining from a country code identifier included in the ingress signaling message that the foreign country is a neighboring country to the home country;
 conducting a velocity check of the mobile device based on the determination that the foreign country is a neighboring country, wherein conducting the velocity check comprises:
  sending, to a home location register (HLR) in the home network, an interrogation request message containing a mobile subscriber identifier associated with the mobile device;
  receiving an interrogation response message containing age of location information and cell identifier information corresponding to the mobile subscriber identifier;
  utilizing the cell identifier information to determine a first geographic reference position and the country code identifier included in the ingress signaling message to determine a second geographic reference position;
  determining an estimated transit time of the mobile device using the first geographic reference position and the second geographic reference position; and
  comparing age of location information with the estimated transit time to determine if the ingress signaling message is to be forwarded to the HLR.

2. The method of claim 1 wherein the ingress signaling message includes a location update message or a send authentication information (SAI) message.

3. The method of claim 1 wherein the interrogation request message is a mobile application part (MAP) AnyTimeInterrogation message (ATI) request message and the interrogation response message is a MAP ATI response message.

4. The method of claim 1 wherein the estimated transit time is determined by using the first geographic reference position and the second geographic reference position as inputs into a haversine formula.

5. The method of claim 1 comprising, in response to determining that the estimated transit time value is less than the age of location information, forwarding, by the network gateway, the ingress signaling message to the HLR.

6. The method of claim 1 comprising, in in response to determining that the estimated transit time value is greater than the age of location information, rejecting, by the network gateway, the ingress signaling message.

7. The method of claim 1 comprising sending, by the network gateway, an alert message to a network operator in response to determining that the estimated transit time value is greater than the age of location information.

8. A system for conducting a velocity check for outbound subscribers roaming to neighboring countries, the system comprising:
 a network gateway including at least one processor, wherein the network gateway is associated with a home network located in a home country;
 a location mapping database for storing geographic reference position data that is mapped to a plurality of cell identifiers; and
 a velocity check engine in the network gateway and implemented using the at least one processor for receiving, from a mobile switching center (MSC) associated with a visited network located in a foreign country that neighbors the home country, an ingress signaling message related to a mobile device roaming in the visited network, determining from a country code identifier included in the ingress signaling message that the foreign country is a neighboring country to the home country, conducting a velocity check of the mobile device based on the determination that the foreign country is a neighboring country, wherein conducting the velocity check comprises sending, to a home location register (HLR) in the home network, an interrogation request message containing a mobile subscriber identifier associated with the mobile device, receiving an interrogation response message containing age of location information and cell identifier information corresponding to the mobile subscriber identifier, utilizing the cell identifier information to determine a first geographic reference position and the country code identifier included in the ingress signaling message to determine a second latitude-longitude position, determining an estimated transit time of the mobile device using the first geographic reference position and the second geographic reference position, and determining if the ingress signaling message is to be forwarded to the HLR by comparing age of location information with the estimated transit time.

9. The system of claim 8 wherein the ingress signaling message includes a location update message or a send authentication information (SAI) message.

10. The system of claim 8 wherein the interrogation request message is a mobile application part (MAP) AnyTimeInterrogation message (ATI) request message and the interrogation response message is a MAP ATI response message.

11. The system of claim 8 wherein the estimated transit time is determined by using the first geographic reference position and the second geographic reference position as inputs into a haversine formula.

12. The system of claim 8 wherein the ingress signaling message is forwarded by the network gateway to the HLR in response to determining that the estimated transit time value is less than the age of location information.

13. The system of claim 8 wherein the network gateway is configured to reject the ingress signaling message in response to determining that the estimated transit time value is greater than the age of location information.

14. The system of claim 13 wherein the network gateway is configured to send an alert message to a network operator in response to determining that the estimated transit time value is greater than the age of location information.

15. A non-transitory computer readable medium having stored thereon executable instructions that when executed by a processor of a computer controls the computer to perform steps comprising:
  receiving, by a network gateway associated with a home network located in a home country from a mobile switching center (MSC) associated with a visited network located in a foreign country that neighbors the home country, an ingress signaling message related to a mobile device roaming in the visited network;
  determining from a country code identifier included in the ingress signaling message that the foreign country is a neighboring country to the home country;
  conducting a velocity check of the mobile device based on the determination that the foreign country is a neighboring country, wherein conducting the velocity check comprises:
    sending, to a home location register (HLR) in the home network, an interrogation request message containing a mobile subscriber identifier associated with the mobile device;
    receiving an interrogation response message containing age of location information and cell identifier information corresponding to the mobile subscriber identifier;
    utilizing the cell identifier information to determine a first geographic reference position and the country code identifier included in the ingress signaling message to determine a second latitude-longitude position;
    determining an estimated transit time of the mobile device using the first geographic reference position and the second geographic reference position; and
    comparing age of location information with the estimated transit time to determine if the ingress signaling message is to be forwarded to the HLR.

16. The non-transitory computer readable medium of claim 15 wherein the ingress signaling message includes a location update message or a send authentication information (SAI) message.

17. The non-transitory computer readable medium of claim 15 wherein the interrogation request message is a mobile application part (MAP) AnyTimeInterrogation message (ATI) request message and the interrogation response message is a MAP ATI response message.

18. The non-transitory computer readable medium of claim 15 wherein the estimated transit time is determined by using the first geographic reference position and the second geographic reference position as inputs into a haversine formula.

19. The non-transitory computer readable medium of claim 15 wherein the ingress signaling message is forwarded by the network gateway to the HLR in response to determining that the estimated transit time value is less than the age of location information.

20. The non-transitory computer readable medium of claim 15 comprising rejecting, by the network gateway, the ingress signaling message in response to determining that the estimated transit time value is greater than the age of location information.

* * * * *

UNITED STATES PATENT AND TRADEMARK OFFICE
CERTIFICATE OF CORRECTION

PATENT NO. : 11,689,912 B2
APPLICATION NO. : 17/319023
DATED : June 27, 2023
INVENTOR(S) : Nair et al.

It is certified that error appears in the above-identified patent and that said Letters Patent is hereby corrected as shown below:

On the Title Page

On page 8, Column 1, under Other Publications, Line 4, delete "Monile" and insert -- Mobile --, therefor.

On page 8, Column 1, under Other Publications, Line 59, delete "Internatioanl" and insert -- International --, therefor.

In the Specification

In Column 13, Line 31, delete "positions" and insert -- positions. --, therefor.

In the Claims

In Column 14, Line 46, in Claim 6, delete "in in" and insert -- in --, therefor.

Signed and Sealed this
Twenty-eighth Day of May, 2024

Katherine Kelly Vidal
*Director of the United States Patent and Trademark Office*